(12) United States Patent
Akahane et al.

(10) Patent No.: US 7,738,465 B2
(45) Date of Patent: Jun. 15, 2010

(54) PACKET FORWARDING DEVICE EQUIPPED WITH STATISTICS COLLECTION DEVICE AND STATISTICS COLLECTION METHOD

(75) Inventors: Shinichi Akahane, Hachioji (JP); Kazuo Sugai, Hadano (JP); Kazuaki Tsuchiya, Ebina (JP)

(73) Assignee: Hitachi, Ltd., Tokyo (JP)

( * ) Notice: Subject to any disclaimer, the term of this patent is extended or adjusted under 35 U.S.C. 154(b) by 897 days.

(21) Appl. No.: 10/885,307

(22) Filed: Jul. 7, 2004

(65) Prior Publication Data

US 2005/0013300 A1 Jan. 20, 2005

(30) Foreign Application Priority Data

Jul. 11, 2003 (JP) .............................. 2003-195453
Jan. 26, 2004 (JP) .............................. 2004-016466

(51) Int. Cl.
  *H04L 12/28* (2006.01)
  *H04L 12/66* (2006.01)
(52) U.S. Cl. ................... 370/395.3; 370/389; 370/392; 370/352; 709/223; 709/224; 395/800
(58) Field of Classification Search ............ 370/395.3, 370/392, 351, 395.31, 395.32, 395.1, 389, 370/229, 401, 231, 412, 465, 352, 240, 238, 370/422; 711/165; 700/80; 709/223, 224; 395/800; 707/2; 364/260
See application file for complete search history.

(56) References Cited

U.S. PATENT DOCUMENTS

| 5,499,382 | A * | 3/1996 | Nusinov et al. ............. 712/210 |
| 5,689,416 | A * | 11/1997 | Shimizu et al. ............... 700/80 |
| 6,185,214 | B1 * | 2/2001 | Schwartz et al. ............ 370/401 |
| 6,449,251 | B1 * | 9/2002 | Awadallah et al. .......... 370/229 |
| 6,473,400 | B1 * | 10/2002 | Manning .................... 370/229 |
| 6,567,408 | B1 * | 5/2003 | Li et al. ................. 370/395.31 |
| 6,665,267 | B1 * | 12/2003 | Iwasaki et al. .............. 370/241 |
| 6,915,012 | B2 * | 7/2005 | Osborne et al. ............. 382/232 |
| 6,968,392 | B1 * | 11/2005 | Wilford et al. .............. 709/240 |
| 7,012,890 | B2 * | 3/2006 | Yazaki et al. ............... 370/229 |

(Continued)

FOREIGN PATENT DOCUMENTS

JP    2000-078133    8/1998

(Continued)

*Primary Examiner*—Aung S Moe
*Assistant Examiner*—Jamal Javaid
(74) *Attorney, Agent, or Firm*—Stites & Harbison, PLLC; Juan Carlos A. Marquez, Esq

(57) ABSTRACT

A packet forwarding device equipped with a statistics collection device and statistics collection method for high speed ports at a low cost while maintaining the required statistical accuracy for each flow. In order to collect a statistic flow with the required accurate statistic information this device contains a high speed flow table, a flow table made up of many flow entries, a search decision table to decide whether to search the high speed flow table or large volume flow table; and the table to be searched is decided when a packet is received. The accuracy of the statistic information for the flow requiring accurate statistic information is guaranteed by the high speed flow table. Further by setting the large volume flow table and sampling rate as needed, statistic information for many flow entries can be collected with a sufficient flow of sampled statistic information, without lowering packet forwarding performance.

22 Claims, 24 Drawing Sheets

U.S. PATENT DOCUMENTS

| | | | |
|---|---|---|---|
| 7,197,597 B1 * | 3/2007 | Scheid et al. | 711/106 |
| 2004/0136368 A1 * | 7/2004 | Wakayama et al. | 370/389 |
| 2004/0186972 A1 * | 9/2004 | Chow et al. | 711/165 |
| 2004/0225639 A1 * | 11/2004 | Jakobsson et al. | 707/2 |
| 2005/0021715 A1 * | 1/2005 | Dugatkin et al. | 709/223 |

FOREIGN PATENT DOCUMENTS

| | | |
|---|---|---|
| JP | 2001-053801 | 8/1999 |
| JP | 2002-208945 | 1/2001 |
| JP | 2002-368798 | 6/2001 |

* cited by examiner

FIG. 7

| FLOW NO. | FLOW CONDITIONS ||||||
| --- | --- | --- | --- | --- | --- | --- |
| | SOURCE IP ADDRESS (701) | DESTINATION IP ADDRESS (702) | UPPER LAYER PROTOCOL (703) | TOS (704) | SOURCE PORT NO. (705) | DESTINATION PORT NO. (706) |
| FLOW 1 | IP_S1 | IP_T1 | TCP | TOS1 | SPRT1 | DPRT1 |
| FLOW 2 | IP_S2 | IP_T2 | UDP | TOS2 | SPRT2 | DPRT2 |
| FLOW 3 | IP_S1 | IP_T3 | TCP | TOS1 | SPRT1 | DPRT3 |
| FLOW 4 | IP_S2 | IP_T4 | UDP | TOS2 | SPRT2 | DPRT4 |

FIG. 8

| FLOW NO. | FLOW STATISTICS |||| |
| --- | --- | --- | --- | --- | --- |
| | PACKET COUNT (801) | BYTE COUNT (802) | INPUT PORT NO. (803) | OUTPUT PORT NO. (804) | OTHER INFORMATION (805) |
| FLOW 1 | 10 | 2000 | C_R2 | C_T1 | ... |
| FLOW 2 | 20 | 2000 | C_R3 | C_T2 | ... |
| FLOW 3 | 30 | 6000 | C_R2 | C_T3 | ... |
| FLOW 4 | 40 | 4000 | C_R3 | C_T4 | ... |

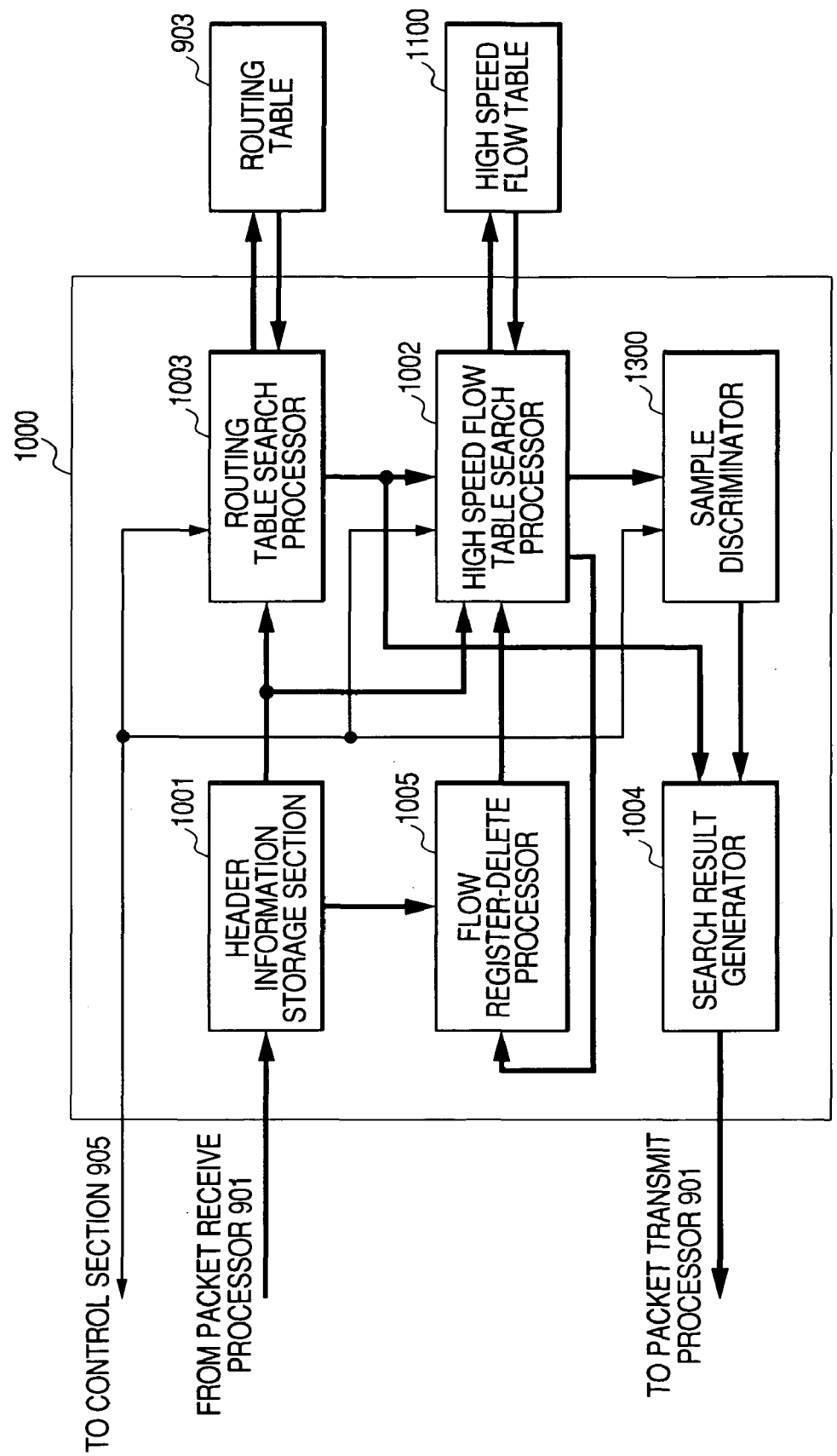

FIG. 11

| FLOW ENTRY NO. | FLOW CONDITIONS | | | | | | | SEARCH RESULTS | |
|---|---|---|---|---|---|---|---|---|---|
| | SOURCE IP ADDRESS | DESTINATION IP ADDRESS | UPPER LAYER PROTOCOL | TOS | SOURCE PORT NO. | DESTINATION PORT NO. | | SAMPLE COMMAND | SAMPLING RATE |
| f1 | IP_S1 | IP_T1 | TCP | TOS1 | SPRT1 | DPRT1 | | 0 | — |
| f2 | IP_S1 | IP_T3 | UDP | TOS1 | SPRT1 | DPRT3 | | 0 | — |
| f3 | * | * | * | * | SPRT2 | * | | 1 | 1/1000 |
| ... | ... | ... | ... | ... | ... | ... | | ... | ... |

| FLOW ENTRY NO. | STATISTIC INFORMATION | | | | |
|---|---|---|---|---|---|
| | PACKET COUNT | BYTE COUNT | INPUT PORT NO. | OUTPUT PORT NO. | OTHER INFORMATION |
| f1 | P1 | B1 | C_R2 | C_T1 | ... |
| f2 | P2 | B2 | C_R2 | C_T3 | ... |
| f3 | P3 | B3 | — | — | ... |
| ... | ... | ... | ... | ... | ... |

| INPUT PORT NO. | PACKET COUNTER |
|---|---|
| IC1 | PKT1 |
| IC2 | PKT2 |
| ⋮ | ⋮ |

| INPUT PORT NO. | SAMPLE INTERVAL |
|---|---|
| IC1 | INT1 |
| IC2 | INT2 |
| ⋮ | ⋮ |

FIG. 18

| FLOW ENTRY NO. | SEARCH RESULTS | | |
| --- | --- | --- | --- |
| | SAMPLE COMMAND | PACKET COUNTER | SAMPLE INTERVAL |
| f1 | 0 | – | – |
| f2 | 0 | – | – |
| f3 | 1 | PKT3 | INT3 |
| ⋮ | ⋮ | ⋮ | ⋮ |

| INPUT PORT NO. | RANDOM NUMBER COUNTER |
|---|---|
| IC1 | RND1 |
| IC2 | RND2 |
| ⋮ | ⋮ |

| INPUT PORT NO. | THRESHOLD VALUE |
|---|---|
| IC1 | TH1 |
| IC2 | TH2 |
| ⋮ | ⋮ |

FIG. 24

| FLOW ENTRY NO. | SEARCH RESULTS | | |
| --- | --- | --- | --- |
| | SAMPLE COMMAND | RAMDOM NUMBER | THRESHOLD VALUE |
| f1 | 0 | — | — |
| f2 | 0 | — | — |
| f3 | 1 | RND3 | TH3 |
| ⋮ | ⋮ | ⋮ | ⋮ |

PACKET FORWARDING DEVICE EQUIPPED WITH STATISTICS COLLECTION DEVICE AND STATISTICS COLLECTION METHOD

CLAIM OF PRIORITY

The present application claims priority from Japanese applications JP 2004-016466 filed on Jan. 26, 2004 and JP 2003-195453 filed on Jul. 11, 2003, the contents of which are hereby incorporated by reference into this application.

FIELD OF THE INVENTION

The present invention relates to a statistics collection method for recording information such as the number of packets transmitted and the number of bytes, as well as a statistics collection device containing the statistics collection method and installed in a network.

BACKGROUND OF THE INVENTION

The Internet has become established as an important part of our social infrastructure and besides conventional Best_Effort type data communications, starts to communicate data needed to ensure communication quality such as transaction data for mainstream business operations and audio-video. The volume of data being communicated is also increasing along with the spread of lines for accessing broadband communications by way of technology such as ADSL (Asymmetric Digital Subscriber Line) and FTTH (Fiber To The Home).

In order to acquire the communication status on the network in the environment described above, the carrier and ISP (Internet Service Provider) require a network monitoring function for collecting and analyzing statistics on the communication data volume on the network. Among this communication data, there is also a large need for a function for collecting and analyzing statistic information for each data group (hereafter flow) categorized into the data source and address, application and quality level, etc. By utilizing statistic information on each flow, the carrier and ISP can verify the quality assurance status when a communication quality assured service is provided. The carrier and ISP can also use limited network resources effectively to handle increased data volume using Traffic engineering (hereafter abbreviated to TE) technique. The carrier and ISP can also offer provisioning service which provides network resources speedily and timely to meet customer requests (bandwidth, quality of services), and can also detect and analyze network attacks, and can also carry out billing, etc.

A flow statistics collection method in the technology of the related art for example is the cache method (related technology 1). The related art 1 technology is made up of multiple statistics collection devices distributed within the network and a collector device for collecting statistic information periodically reported from these multiple statistics collection devices and analyzing traffic over the entire network. One example of a statistics collection device is a router that performs packet transfer in the network. Hereafter the processing by the statistics collection device in the related art is described using a router as an example.

When a packet is received, the router incorporating a statistic collection function searches a flow table in which one or more combinations (hereafter called flow conditions) of packet headers are stored (or registered) for identifying the flow. If the packet matches the stored flow conditions, then a 1 is added to the packet number stored for that matching flow conditions. The byte count of the received packet stored for that matching flow condition is also increased in the same way. If results from the search of the flow table show no matching flow condition, then the received packet header information combination is newly stored in the flow table. A search is made at fixed periodic intervals of each flow condition stored in the flow table and aging processing is performed to delete flow conditions whose statistic information is unchanged from the previous search. To delete a flow condition, a packet with the corresponding statistic information is generated and the packet sent to the collector device.

The number of bits for the search key in the flow table search is usually large compared to the number of bits of the search key for the destination search made when the router forwards a packet. Therefore, shortening the time needed for the flow table search is difficult compared to the destination search. This fact signifies that flow table search time takes up a large part of the router's packet processing time. The flow table search process therefore causes packet forwarding performance to deteriorate when flow table search time is larger than the required packet forwarding processing time.

In the related art technology 2, in order to alleviate the drop in packet forwarding performance due to the flow table search, routers containing high speed lines (ports) perform sampling of packets for flow table searches, according to a predetermined sampling rate and only make a flow table search of the sampled packets.

Though not a flow table search technology, a technology for making routing table searches was disclosed in JP-A No. 208945/2002 (Related technology 3). The related technology 3 utilizes a stored path table capable of spanning a first memory made up of high speed memories such as a Content Addressable Memory (CAM), and a second memory with a slower search speed than the first memory but possessing a higher degree of entry integration. The related technology 3 is capable of making entry searches requiring a larger number of bits than can be set in the CAM at higher speeds than when utilizing only a RAM (Random Access Memory).

[Patent document 1] JP-A No. 208945/2002

The above described related technologies 1 and 2 have the following problems when handing ever-increasingly large amounts of data, and in quality assurance of important data.

The search key for flow table that is a combination of multiple fields within the packet header has a larger number of bits compared to the search key for destination searches that is made up of only one field within the packet header or combinations of two fields. The number of flow conditions (hereafter, number of flow entries) stored in the flow table must also be several times larger than the number of entries in the destination table.

One method for searching tables comprised of multiple entries is a method (hereafter, Tree method) for storing flow tables in a tree structure in the memory by utilizing Dynamic Random Access Memory (DRAM) or Static Ram (SRAM) having an inexpensive cost per bit. Using the Tree method has the advantages that only a small number of memory chips are needed when storing information in a table made up of a large number of entries, the device has a low cost, and little installation space is needed in the device. However, multiple memory access lines are usually needed during a search so the search performance falls to only a fraction (less than a fifth or sixth) of that of the CAM method described next. So when search a flow table made up of a large number of entries, a device with a high line (circuit) speed will have a longer flow table search time than the allowable packet transmit time, due to time required for making the flow table search. The related art technology 1 that searches all received packets in a flow table, therefore cannot provide the required packet transmit performance.

The related art technology 2 provides the required packet transmit performance needed holding lines (port) with a high line speed by lowering the number of times flow table searches are made according to a preset sampling rate. This method performs packet sampling and is capable of finding statistical trends of each packet flow. However this method cannot acquire an accurate number of received packets or a received byte count. This method performs TE and provisioning, network facility planning, and attack detection by finding the statistical flow data size using the sample statistical value. Yet this method has problems because of use of sampling (sample statistical value) in cases for example where utilizing information shown by the network administrator to the network user regarding whether quality assurance is actually being performed on a network for a flow where quality assurance is needed, or when billing, where utilizing an accurate packet count or byte count is important.

One method for making high speed searches where the search key has a large number of bits is a search method using CAM (hereafter, called the CAM method). The CAM method is capable of high speed searches of search key bit patterns and bit patterns recorded in the memory. However, the cost per bit is high compared to typical memories. Other problems with the CAM method are that the number of CAM chips increases when dealing with large numbers of entries so that the device cost becomes higher, and the available mounting surface area inside the device is inadequate, etc. Yet another problem is that power consumption is high since all bit patterns registered in the memory and the search key bit pattern are compared in parallel.

The related art technology 3 discloses a method for high speed router searches of routing table. However it does not discuss flow table searches. In methods utilizing CAM and RAM, the time needed for accessing the RAM is added on to the time for the CAM method. Also, the same as with the Tree method when searching flow tables made up of a large number of entries in devices having lines (ports) with a high line speed, the time needed for searching the flow table becomes longer than the allowable packet forwarding processing time. In the related art technology 1 that searches all received packets in a flow table search, achieving the required packet processing performance is difficult

SUMMARY OF THE INVENTION

A first object of the present invention is to provide a packet forwarding method or a packet forwarding device capable of acquiring accurate statistic information on a flow requiring accurate statistic information even when the data size has increased and high speed packet forwarding processing is required. A second object of the present invention is to provide a packet forwarding method or a packet forwarding device capable of collecting statistics on a large number of flows, even when there has been a further increase in the volume of packets to transmit.

The router of the present invention contains a first table and a means for searching the first table, a second table and a means for searching the second table, and a discrimination means for discriminating between (received) packets requiring collection of all statistic information and packets not requiring collection of all statistic information. To implement the discrimination means, the router of the invention also contains a search discrimination table to decide if the first table or the second table should be searched, and a means to search the search table—discrimination table. The means for searching the first table, the second table and the discrimination table may all be achieved with one search means.

When the router receives a packet, besides performing the usual routing, the router searches the search table—discrimination table and decides whether to search the first table or the second table. When the router decides to search the first table search, a search is made of the first table and statistics matching the same flow conditions are rewritten.

The received packets are separated prior to processing so the time required to process the packets is reduced compared to the case of collecting statistic information on all received packets. The accuracy of the collected statistic information is also improved for flows requiring total collection compared to the case of using sampling to collect statistic information from all packets.

On the other hand, for packets needing a second table search, a decision to search or not search the second table is made according to the sampling rate that was set in the storage means. When decided to search the second table, the second table search processor searches the second table, and statistics for corresponding flow conditions are rewritten.

Sampling those packets belonging to the same flow conditions stored in the second table, allows increasing the number of flow types capable of collecting statistic information having the same packet forwarding performance. Also, conditions for identifying an adequate flow with sampled statistical values are set in the discrimination table. Further, sampled values from a large number of flows can be collected without lowering the packet forwarding performance, by setting a sampling rate in the storage means at a level that will not lower the packet forwarding performance. Problems other than the above that the present specifications attempt to resolve, and those means to resolve the problems are clarified in the "Detailed Description of the Preferred Embodiments" section and in the drawings.

By utilizing the statistics collection device of the present invention to set conditions for identifying flows requiring accurate statistic information in the search table-discrimination table, accurate statistic information without sampling can be collected for flows requiring accurate statistic information, without lowering the packet forwarding performance. Further, sampled statistical values from a large number of flow samplings can be collected without lowering the packet forwarding performance, by setting conditions for identifying a sufficient number of flows with sampled statistical values, and by setting a sampling rate in each storage means at a level that will not lower the packet forwarding performance.

BRIEF DESCRIPTION OF THE DRAWINGS

FIG. 7 is a diagram showing an example of the flow condition structure for flow statistics collected by the router R1 in FIG. 1;

FIG. 8 is a diagram showing an example of the flow condition structure of flow statistics collected by the router R1 in FIG. 1;

FIG. 10 is a block diagram showing the structure of the search processor within the router for the statistics collection method of the present invention;

FIG. 11 is drawings showing the structure of a high-speed flow table within the router for the statistics collection method of the present invention;

FIG. 15 is a drawing showing a packet number counter table for each input port utilized in the sample discriminator of FIG. 14;

FIG. 16 is a drawing showing sample period (interval) table for each input port utilized in the sample discriminator of FIG. 14;

FIG. 18 is a drawing showing the structure of a high-speed flow table utilized in the sample discrimination method of the present invention;

FIG. 21 is a drawing showing the structure of the random number table for each input port utilized in sample discriminator FIG. 20;

FIG. 22 is a drawing showing the structure of the threshold table for each input port utilized in sample discriminator FIG. 20;

FIG. 24 is a drawing showing the structure of a high-speed flow table utilized in the sample discrimination method shown in FIG. 23;

DETAILED DESCRIPTION OF THE PREFERRED EMBODIMENTS

First Embodiment

The flow statistic collection function for the network is described next while referring to FIG. 1, FIG. 2, FIG. 3, FIG. 4 and FIG. 5. In the present embodiment, "statistic information" signifies processing the router must perform on received packets in order to acquire the specified statistic information as well the type of information the router must collect. The term "statistic information" used here is therefore different from the generally used meaning.

Figure 1:
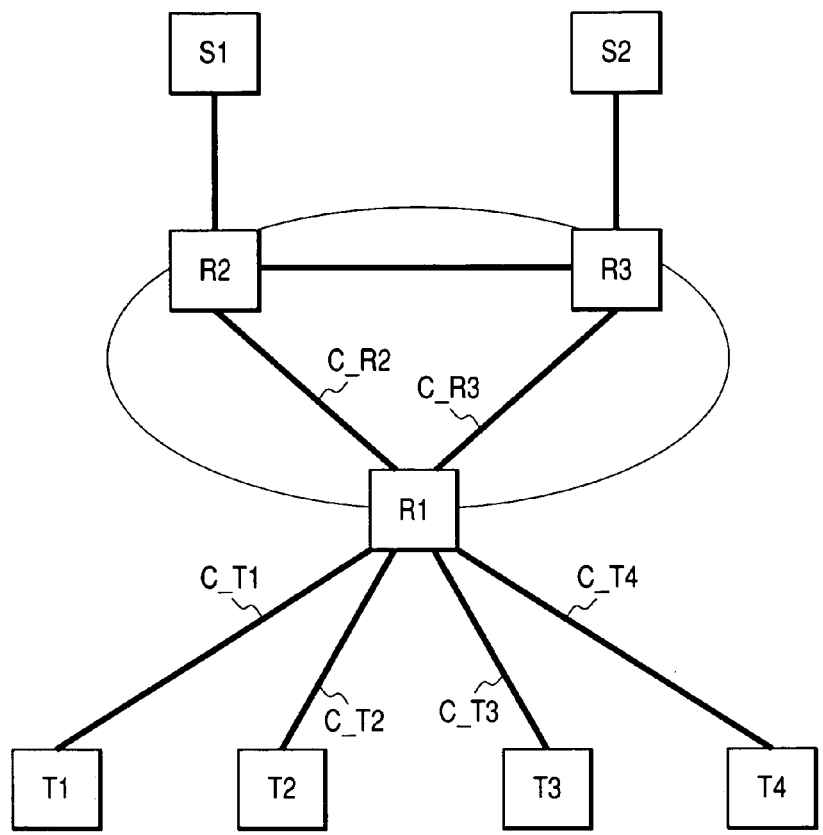
FIG. 1 is a drawing showing the network structure comprised of routers for the statistics collection method of the present invention.

FIG. 1 is a drawing showing a typical network structure made up of routers having the flow statistic collection function. The network shown in FIG. 1 is made up of terminals T1, T2, T3, T4, servers S1, S2, and routers R2, R3 each connected with the servers, and a router R1 connected by way of the ports C_T1, C_T2, C_T3, C_T4, C_R2, C_R3 with these terminals and servers. The packet belonging to the flow (hereafter flow 1) is sent from the server S1 to the terminal T1. The upper or host protocol within the IP (Internet Protocol) header in flow 1 is TCP (Transmission Control Protocol). The TOS (Type of Service) within the IP header in flow 1 is TOS1. The source port number within the TCP header in flow 1 is SPRT1. The destination port number within the TCP header in flow 1 is DPRT1.

The packet belonging to the flow (hereafter flow 2) is sent from the server S1 to the terminal T3. The upper or host protocol of this packet (flow 2) is TCP. The TOS is TOS1. The source port number is SPRT1. The destination port number is DPRT3. The packet belonging to the flow (hereafter called flow X3) is sent from the server S2 to the terminal T2. The upper or host protocol of this flow x3 is UDP (User Datagram Protocol). The TOS is TOS2. The source port number within the UDP header is DPRT2. The destination port number within the UDP header is DPRT2. The packet belonging to the flow (hereafter flow 4) is sent from the server S2 to the terminal T4. The upper or host protocol of this flow4 is UDP (User Datagram Protocol). The TOS is TOS2. The source port number (within the UDP header) is SPRT2. The destination port number is DPRT4.

Figure 2:
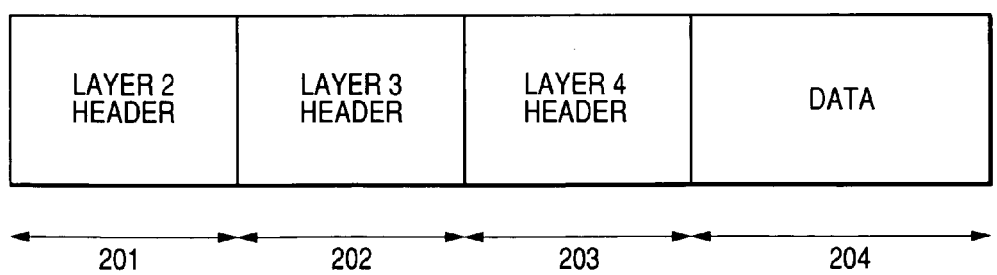
FIG. 2 is a diagram showing the structure of the packet received in FIG. 1.

FIG. 2 is a diagram showing the packet being sent or received. The packet here is made up of data and multiple header information for protocols in each layer of the OSI (Open System Interconnection) model. More specifically, the packet is made up of a layer 2 header (201), a layer 3 header (202), a layer 4 header (203), a data (204). Protocols such as Ethernet (registered trademark), ATM (Asynchronous Transfer Mode), MPLS (Multi_Protocol Label Switching) can be utilized as the layer 2 protocol. Protocols such as IP version 4 (hereafter, IPv4), IP version 6 (hereafter, IPv6) can be utilized as the layer 3 protocol. Protocols such as TCP, UDP can be utilized as the layer 4 protocol.

Figure 3:
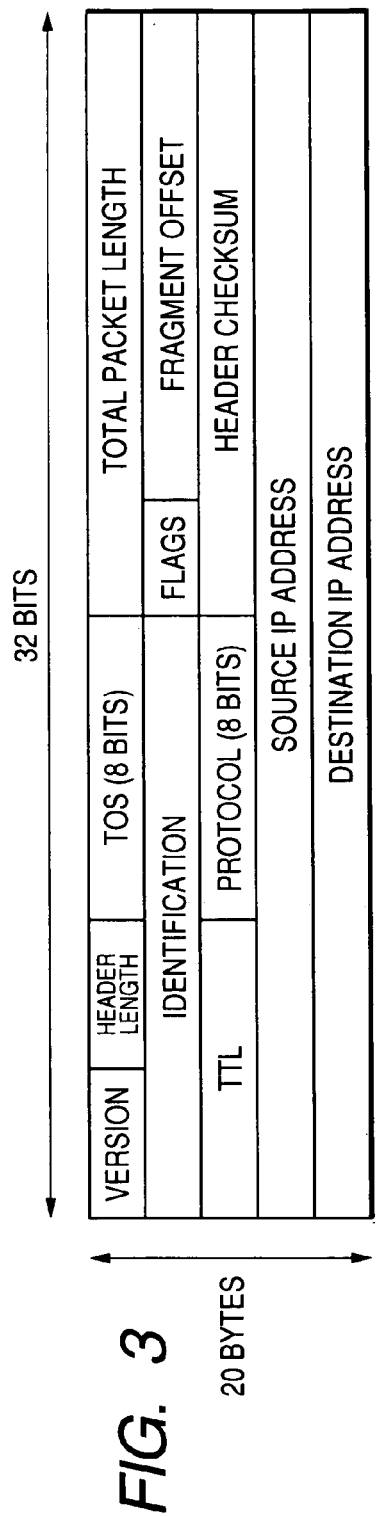
FIG. 3 is a diagram showing the structure of the IPv4 header.

FIG. 3 is a diagram showing the structure of an IPv4 header, utilizing the header of the layer 3 protocol as an example. This IPv4 header contains a ToS to indicate the transmit quality of the packet, a protocol showing the layer 4 protocol, an IP address (source IP address) for the source terminal, and an IP address (destination IP address) for the destination terminal. The ToS and the protocol are 8 bits. The source IP address and the destination IP address are both 32 bits.

Figure 4:
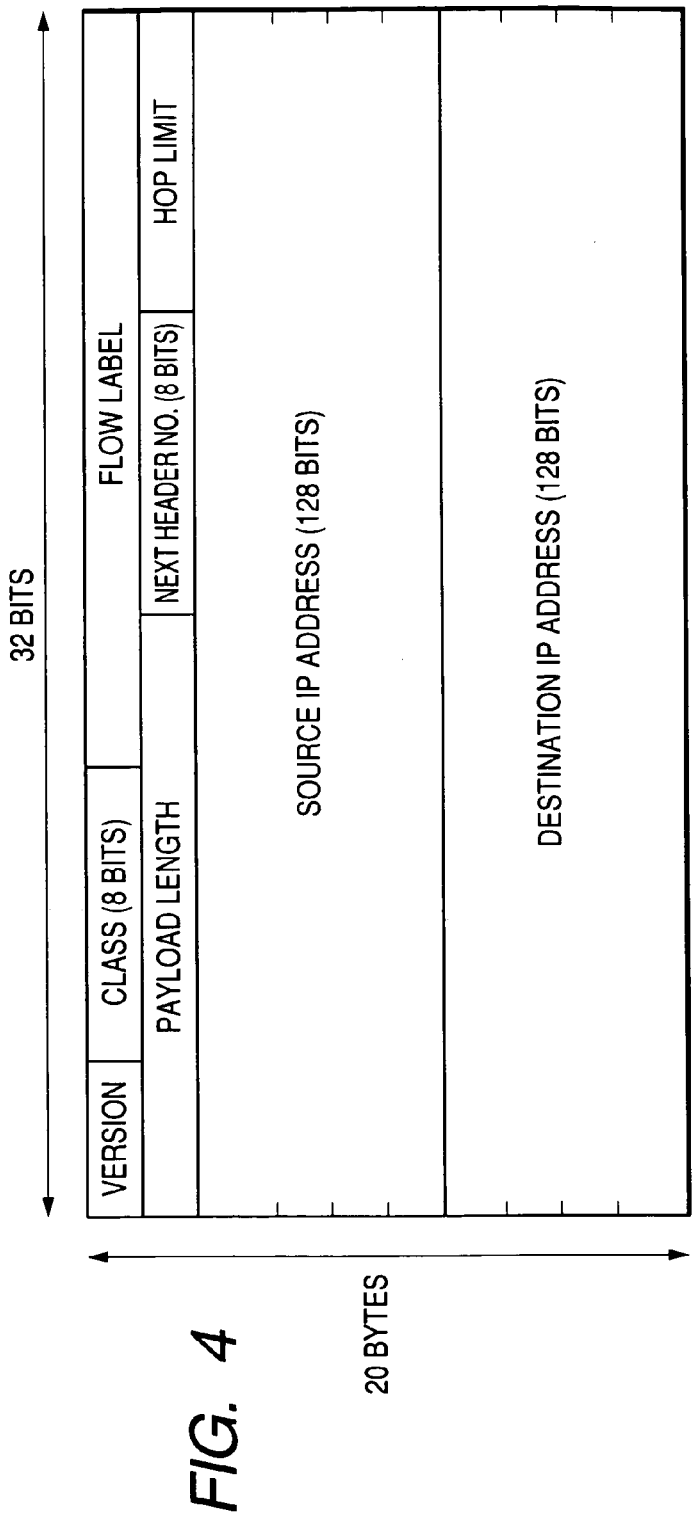
FIG. 4 is a diagram showing the structure of the IPv6 header.

FIG. 4 is a diagram showing the structure of an IPv6 header, utilizing the header of the layer 3 protocol as an example. This IPv6 header stores a class indicating the transmit quality of the packet, the following header number for identifying the next header type, source IP address and destination IP address. When the next header is a layer 4 protocol such as TCP or UDP, then a value showing the layer 4 protocol is stored in the next header number. The class is eight bits. The next header number is eight bits, the source IP address and the destination IP address are both 128 bits.

Figure 5:
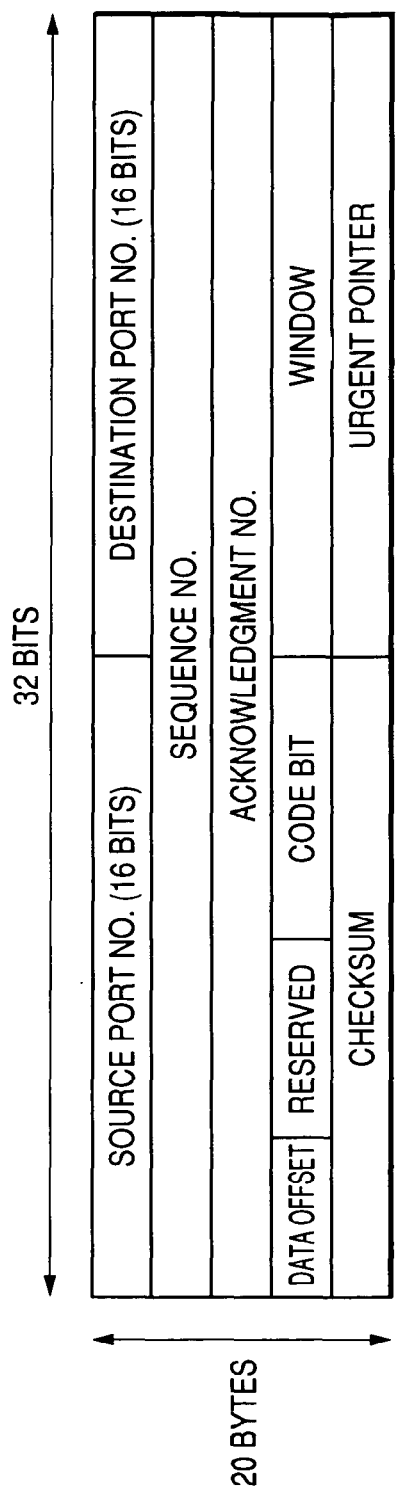
FIG. 5 is a diagram showing the structure of the TCP header.

FIG. 5 is a diagram showing the structure of the TCP header using the header of a layer 4 protocol as an example. The TCP header contains a source port number and a destination port number as a logic port number for identifying the host (upper) application layer. The source port number and the destination port number are both 16 bits.

Figure 6:
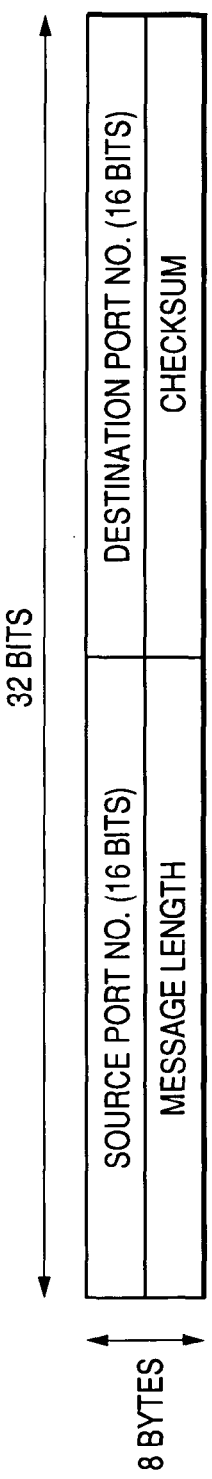
FIG. 6 is a diagram showing the structure of the UDP header.

FIG. 6 is a diagram showing the structure of the UDP header using the header of a layer 4 protocol as an example. The UDP header contains a source port number and a destination port number, the same as does the TCP header. The source port number and the destination port number are both 16 bits.

FIG. 7 is a diagram showing flow conditions for flow statistics collected in the router R1 of FIG. 1. The example in FIG. 7, shows the source IP address (701), the destination IP address (702), the host protocol (703), the TOS (704) within the UDP header, and the source port number (705) and destination port number (706) as the flow conditions within the TCP or IP header. The combination of header values utilized as the flow conditions here are only a present embodiment and combinations of other values may also be utilized.

FIG. 8 is an example of statistic information collected for each flow condition. In the example in FIG. 8, the statistic information for collection is the number of received packets belonging to each flow (hereafter, called the packet count) (801), the total sum of the number of bytes for packet belonging to that flow (hereafter called the byte count) (802), the port number where packets for each flow are input (803), the port number where packets for each flow are output (804), and other information (805). The flow 1 and flow 3 require quality assurance. The flow 1 and flow 3 require quality assurance and are flows requiring accurate statistic information. The flow 2 and flow 3 are flows with adequate statistic sampled values.

The statistic information shown in FIG. 8, is held within the packet forwarding device in a format such as a table. When a packet is received, the received packet is analyzed, the flow conditions extracted, and a search key used to search for flow conditions matching the statistic information held within the device. The received packet is processed as needed based on the hits found in the statistic information. Information acquired from the processing results is stored in the device. The process is described next in detail.

Figure 9:
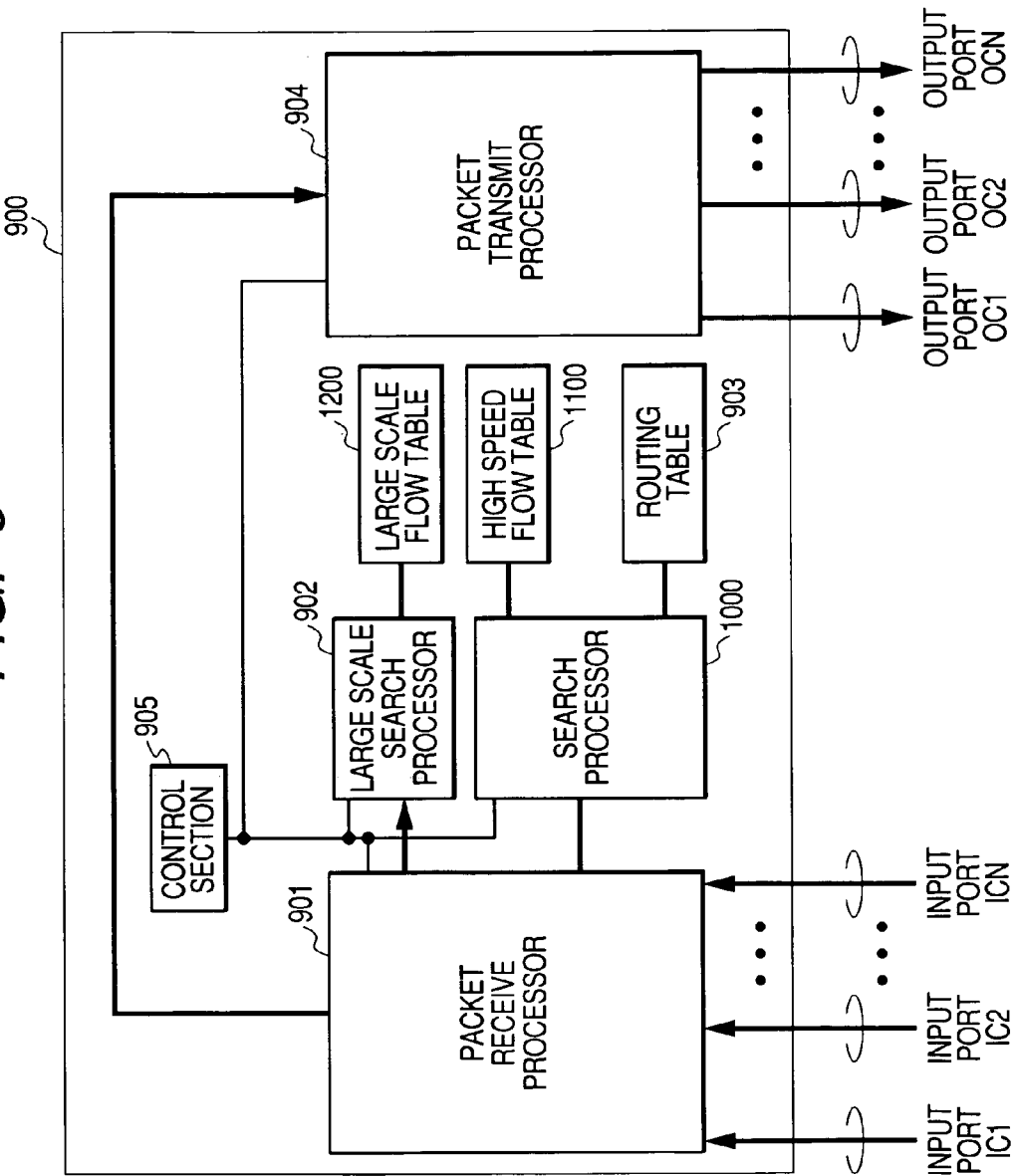
FIG. 9 is a block diagram of the structure of the router for the statistics collection method of the present invention.

The structure of the packet forwarding device of the present embodiment is described next while referring to FIG. 9 through FIG. 24. The router 900 in FIG. 9 is comprised of an input port ICn (n=1 through N), an output line OCn (n=1 through N), a packet receive processor 901, a search processor 1000, a large scale flow table search processor 902, a large scale flow table 1200, a high-speed flow table 1100, a routing table 903, a packet transmit processor 904, and a control section 905. The control section 905 is connected to the packet receiver processor 901, a search processor 1000, a large scale flow table search processor 902, and packet transmit processor 904 and makes the settings for each of these processors. A method for operating the elements 901 through 905, 1000, 1100 and 1200 in the router 900 for example is to operate each processor on a single dedicated LSI (device) and connect each processor alternately to the dedicated LSI (device). Another method is to operate multiple processors on a single dedicated LSI, connecting that dedicated LSI alternately to each of the multiple processors.

Another method is to operate the elements in the router 900 on a general-purpose MPU (Micro Processing Unit) or NP (Network Processor). A CAM (Content Addressable Memory) capable of high-speed searches may be utilized as the memory for storing the high speed flow table 1100. A DRAM capable of storing multiple flow entries and having a small chip size per bit, as well as an inexpensive cost per bit may be utilized as the memory for storing the large scale flow table 1200.

The router 900 shown in FIG. 9 is a structure with a search table-discrimination table within the high-speed flow table for deciding the high speed flow table processing and large scale flow table processing. In this case, the search processor 1000 searches the search table-discrimination table within the high-speed flow table at the same time as it searches the high-speed flow table, and decides whether or not to search the large scale flow table.

The router of the present embodiment is comprised of an architecture for searching always first searching the high-speed search table. However the architecture can contain a function for deciding whether to search either the high-speed search table of the large search table. In other words, an architecture can be achieved wherein the packet receive processor 901 decides whether to transmit the packet to the large search processor or the search processor. However, in this case also, the header information for the packet must always be transmitted to the search processor. In order to decide the packet transmission destination, besides a high-speed flow table search, a routing table search must also be made by the search processor.

Figure 30:
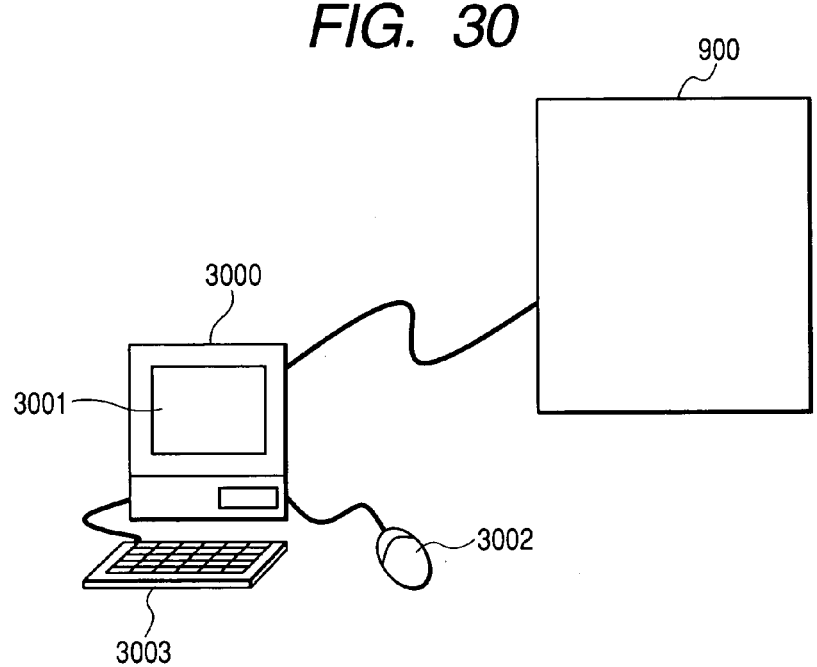
FIG. 30 is a concept drawing of the control console connected for setting the discriminator table of the statistics collection method of the present invention.
Figure 31:
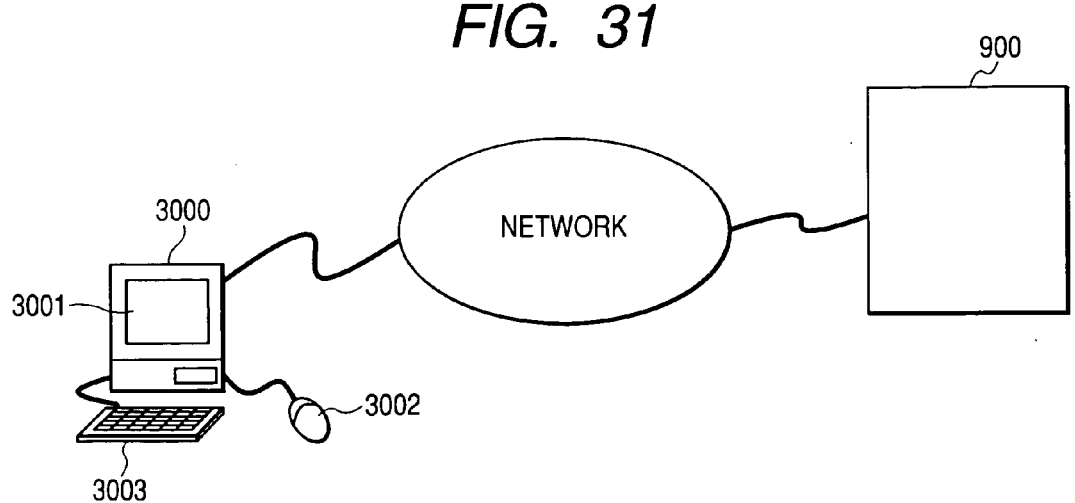
FIG. 31 is a concept drawing of the control console connected for setting the discriminator table of the statistics collection method of the present invention.

A control console can be installed in the router as shown in FIG. 9 and information stored in the discriminator table can be set there as needed. A concept view of the control console 3000 connection for setting the discrimination table within the router, and the router 900 for the statistic collection function of the present invention are shown in FIG. 30. A means for selecting the desired location for displayed contents and changing the displayed contents of the table by way of a display screen 3001 for displaying the contents of the table, and the mouse 3002, and the keyboard 3000 is installed in the control console 3000. As shown in FIG. 31, this console may also be connected by way of a network to the router 900 for the statistic collection function of the present invention. The function of the console may also be held in a collector device, and that collector device may set information stored in the discrimination table, into the router 900.

FIG. 10 shows a typical structure of the search processor 1000 in the router 900 of FIG. 9. The search processor 1000 is made up of a header information storage section 1001, a high-speed flow table search processor 1002, the routing table search processor 1003, the sample discrimination section 1300, the search result generator 1004, and the flow register-delete processor 1005.

FIG. 11 shows the structure of the high-speed flow table 1100 of FIG. 9 and FIG. 10. The flow table 1100 holds one or more entries comprised of a flow entry number field 1101, a flow condition field 1102, a search result field 1103, and a statistic information field 1104. The flow entry number field 1101 is information relating to a flow condition field 1102, a search result field 1103, a statistic information field 1104 and in some cases may be unnecessary depending on the table structure. The flow conditions identical to those shown in FIG. 7 are one example of the flow condition field 1102. In other words, the example of the flow condition field 1102 shown in FIG. 11, is a combination of the source IP address, the destination IP address, the host (upper layer) protocol, the TOS, the source port number, and the destination source port number.

The flow 1 and the flow 3 as flows requiring the accurate statistics shown in FIG. 7, are respectively set as the flow entry numbers f1, f2 in the high-speed flow table 1100. In the example in this embodiment, the search table-discrimination table is contained within the high-speed flow table. More specifically, a flow entry number f3 is set in order to set instructions to search the large search table for flow 2, and flow 4 adequately sampled for the statistics shown in FIG. 7. The "*" shown in the fields for the source IP address field, destination IP address field, host (upper layer) protocol field, TOS field, and destination port number field for flow conditions matching those in the flow entry number f3, indicates that the value is not utilized as a flow condition. In other words, the flow condition for flow entry number f3 indicates that the "Source port number =SPRT2". By setting the flow entry number (No.) f3 when making a high-speed flow table search of packets, the entry in the flow entry number f3 will be a hit when the source port numbers for flow 2 and flow 4 are both SPRT2.

The search result field 1103 is comprised of a sample command flag 1103_1 and sampling rate 1103_2. The sampling rate here is frequency information as to how often (at what frequency) statistic collection is performed. A "1" setting in the sample command flag 1103_1 indicates sampling and copying of the packet hit into the large table search processor. A setting of "0" indicates no sampling or copying is performed. The sampling rate is set in the sampling rate 1103_2 when copying the packet hit in each flow into the large scale flow table search processor.

The sampling rate 1103_2 setting is valid when a "1" is set in the sample command flag 1103_1. In FIG. 11, the sample command flag set to "1" and the sampling rate value set to "1/1000" indicate the search results of the flow entry number (No.) f3 specifying a large scale flow table search. A sampling rate value of "1/1000", indicates a large scale flow table search made for one packet among 1,000 packets that were received. The sampling rate 1103_2 may at times be used for other information according to the formula as described later on.

The example in the statistic information field 1104 shows the information identical to the statistic information shown in FIG. 7. In other words, the example in the statistic information field in FIG. 11 is comprised of a packet count, a byte count, the input port number, the output port number, and other information. The "_" in the input port number and output port number of the flow entry number f3 indicate a value with no meaning.

The flow entry numbers f1, f2 set in FIG. 11 are not set in particular by the router 900 administrator and may be automatically set in the flow register-delete processor 1005. The entry for flow entry number f3 for commanding a large scale flow table search specified in FIG. 11, must be set beforehand by the router 900 administrator. The operation for registering and deleting flows by the flow register-delete processor 1005 is described later.

Figure 12:
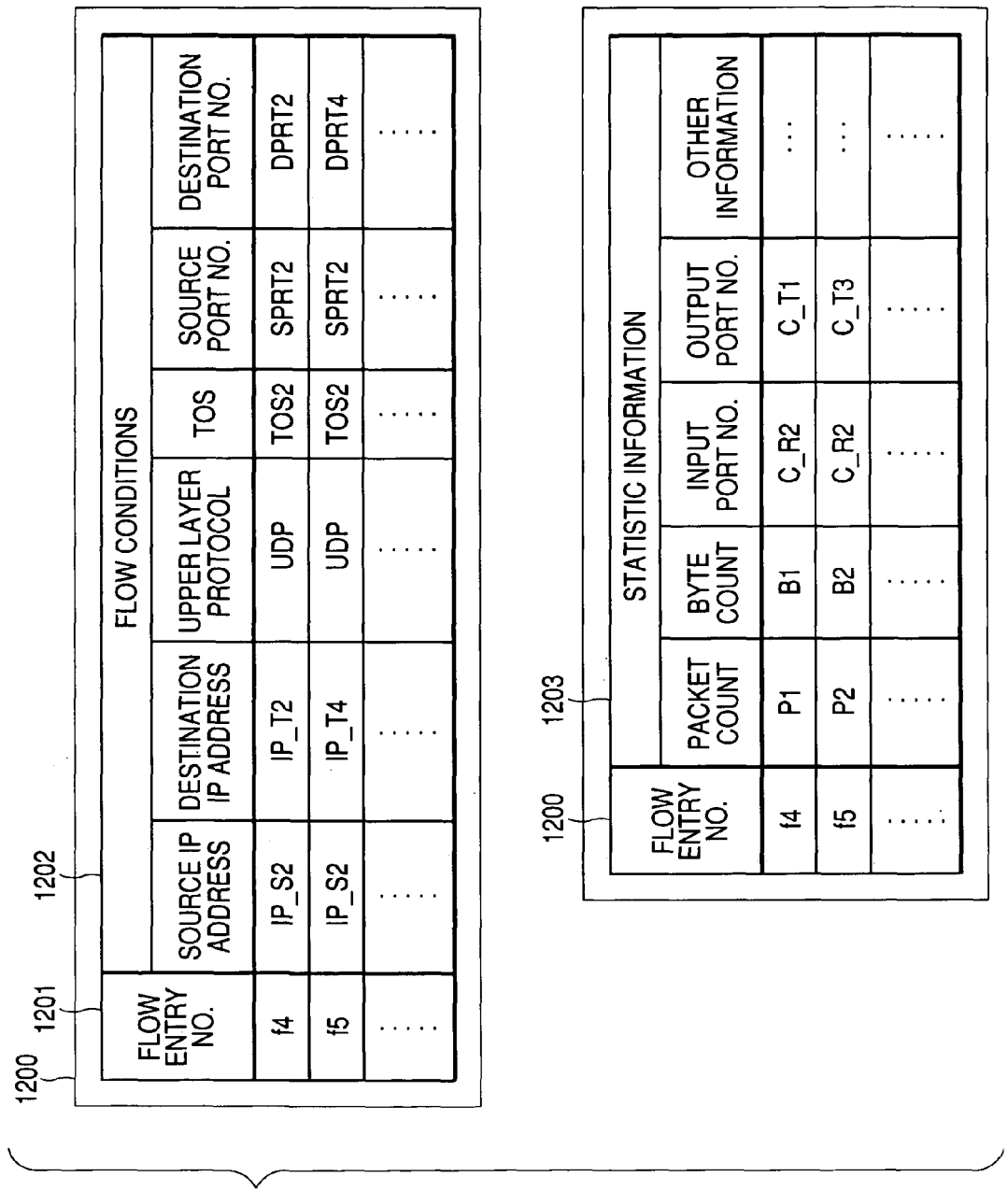
FIG. 12 is drawings showing the structure of a large scale flow table within the router for the statistics collection method of the present invention.

FIG. 12 is drawings showing the structure of the large scale flow table 1200 of FIG. 9. The large scale flow table 1200 is made up of one or more entries comprised of a flow entry number 1201, a flow condition 1202, and statistic information 1203. The flow entry number 1201 is information relating to the flow condition 1202, a statistic information 1203, and in some cases may be unnecessary depending on the table structure. The flow conditions identical to those shown in FIG. 7 are one example of the flow condition 1202. In other words, the example of the flow condition 1202 shown in FIG. 12, is a combination of the source IP address, the destination IP address, the host (upper layer) protocol, the TOS, the source port number, and the destination source port number.

The flow 2 and flow 4 with adequate sample statistical values shown in FIG. 7 are respectively set as the flow entry numbers f4, f5 in the large scale flow table 1200. The statistic information 1203 is shown with statistic information identical to that shown in FIG. 7. In other words, the example for statistic information 1203 in FIG. 12 is comprised of a packet count, a byte count, the input port number, the output port number, and other information.

The entries for flow entry number f4, f5 set in FIG. 12 are not set in particular by the router 900 administrator and may be automatically set by the flow register-delete processor (not shown in drawing) within the large scale flow table search processor. The registering and deleting operation of the flow register-delete processor within the large scale flow table search processor 902 is the same processing as the flow register-delete processing of FIG. 10 and is described later on.

The operation when the router 900 receives a packet is described next using FIG. 9, FIG. 10, FIG. 11 and FIG. 12.

The router 900 operation when receiving a packet belonging to the flow 1 shown in FIG. 7 is described first. In FIG. 9, the packet receive processor 901 that received the packet input from the input port, first of all attaches information within the device relating to receive processing such as an input port number (No.) to the packet as a header within the device. The processor 901 then accumulates the packet data and extracts header information such as the header within the device, layer 2 header, layer 3 header, and layer 4 header and sends it to the search processor 1000. The header information storage section 1001 in FIG. 10, temporarily accumulates header information received from the packet receive processor 901 and sends it to the routing table search processor 1003, high-speed flow table search processor 1002, and the flow register-delete processor 1005.

The routing table search processor 1003 that received the header information, extracts the required information from that header information and generates a search key. The processor 1003 then searches the routing table 903 using that generated search key. The routing table search processor 1003 sends destination information such as the output port number as search results from the routing table 903, to the high-speed flow table 1002 and search result generator 1004.

The high-speed flow table search processor 1002 that received the header information extracts the source IP address, destination IP address, host (upper layer) protocol, TOS, source port number, and destination port number from that header information and generates a search key. The processor 1002 then searches the high speed flow table 1100 using that search key. In the case of the present embodiment, the received packet belongs to the flow 1 so the search key matches the flow entry number f1 of high speed flow table 1100. Therefore, the high-speed flow table search processor 1002 acquires the two results of a sample command flag "1" and an invalid sampling rate, and sets the two values in the search results for the flow entry number f1. The high-speed flow table search processor 1002 sends these search results to the sample discrimination table 1300.

The high-speed flow table search processor 1002 rewrites the statistic information field 1104 for the flow entry number f1 that matched the search key flow conditions. More specifically, a 1 is added to the packet count for the flow entry number f1, the byte count of the received packet is added to the byte count, the input port number within that device header is recorded in the input port number, and the output port number received from the routing table search processor 1003 is recorded in the output port number.

The sample discrimination table 1300 that received the search results from the high-speed flow table search processor 1002 decides whether or not to generate a copy in the large scale flow table search processor 902 based on those search results, and sends a copy command to the search result generator 1004. More specifically, a decision not to make a copy is made when the sample command flag in the search results is a "0". When the sample command flag is a "1", a decision is made on whether or not to generate a copy utilizing the sampling rate search results. In this example, the sample command flag is "0" so the sample discrimination table 1300 does not issue a copy command to the search result generator 1004. The detailed embodiment of the sample discrimination table 1300 is described next while referring to FIG. 13.

The search result generator 1004 that received the destination information from the routing table search processor 1003 generates search result information based on the destination information received from the routing table search processor 1003, and sends the search result information to the packet receive processor 901. In this example, the search result generator 1004 does not receive that copy command from the sample discrimination table 1300, so no copy is generated in the large scale flow table search processor 902.

The packet receive processor 901 that received the search result information from the search result generator 1004 within the search processor 1000, attaches the search result information to that accumulated packet data and sends it to the packet transmit processor 904. The packet transmit processor 904 that received the packet data attached with that search result information, extracts the output port number from the search result information and sends the packet from the corresponding port to that output port number.

The router 900 operation when a packet belonging to the flow 2 in FIG. 7 is received is described next. The operation from the time the packet receive processor 901 receives the packet, through the time the high-speed flow table search processor 1002 searches the high speed flow table 1100 is the same as the operation when the packet belong to flow 1 is received.

In the present embodiment, the search key matches the flow entry number f3 of high speed flow table 1100 since it is assumed a packet belonging to flow 2 was received. The high-speed flow table search processor 1002 acquires the two results of a sample command flag "1" and a sampling rate of "1/1000" and these two values are set in the search results for the flow entry number f3. The high-speed flow table search processor 1002 sends these search results to the sample discrimination section 1300. The high-speed flow table search processor 1002 rewrites the statistic information field 1104 for the entry number f1 that matched the search key for the flow conditions.

The sample discrimination section 1300 that received the search results from the high-speed flow table search processor 1002, decides whether or not to copy the search results into the large scale flow table search processor 902. The discrimination section 1300 notifies the search result generator 1004 of the copy command. In the present embodiment, the sample command flag is "1", so the sample discrimination section 1300 further decides whether or not to generate a copy at a rate in compliance with the sampling rate of the search results. If 1300 decides not to make a copy according to the sampling rate, then the sample discrimination section 1300 does not notify the search result generator 1004 of the copy command.

When the sample discrimination section 1300 decides to make a copy according to the sampling rate, the sample discrimination section 1300 informs the search result generator 1004 of the copy command. The following operation for the case where the search result generator 1004 was not informed of the copy command is the same as the operation when the packet belonging to the flow 1 was received and so a description is omitted. Hereafter, the operation is described where the search result generator 1004 is notified of the copy command. A detailed embodiment of the sample discrimination section 1300 is described while referring to FIG. 13.

When the destination information is received from the routing table search processor 1003, the search result generator 1004 that received the copy command from the discrimination section 1300 generates search result information based on the destination information received from the routing table search processor 1003. Since the copy command has been received, a flag (Hereafter called a copy flag.) set to a "1" to show there is a copy in the search result information is sent to the packet receive processor 901. After having sent the search results, the search result generator 1004 adds information identical to the search results, sets a flag (hereafter, large scale flow table search processor flag) to "1" to command sending of a copy to the large scale flow table search processor, and sends it to the packet receive processor 901. Hereafter, the search result information added to the large scale flow table search processor flag, is called the search result information copy.

The packet receive processor 901 that received the search result information from the search result generator 1004 inside the search processor 1000, first of all attaches search result information to that accumulated packet data and then sends it to the packet transmit processor 904. At this time, a search is made in the search result information for a value of "1" in the copy flag, and a decision made to also use the same packet data for the next search result information copy received. Next, the packet receive processor 901 that received the search result information copy from the search result generator 1004 searches for a "1" value in the large scale flow table search process flag within the search result information copy, attaches a search result information copy to the accumulated packet data used for sending to the packet transmit processor 904, and transmits it to the large scale flow table search processor 902. Also the data sent to the large scale flow table search processor 902 may for example be only information extracted from header information required for making a large scale flow table search.

The packet transmit processor 904 that received the packet data attached with that search result information, extracts the output port number from that search result information, and sends the packet to that output port number from the corresponding port. The large scale flow table search processor 902 that received the packet data attached with that search result information copy, extracts information required for making a large scale flow table search from the packet data and generates a search key. The processor 902 then utilizes that search key to search the large scale flow table 1200. The search key of the present embodiment is described as identical to the search key generated by the high-speed flow table search processor 1002. However the search key utilized in the high-speed flow table search processor 1002 may be different from the search key used in the large scale flow table search processor 902.

In the present embodiment, the search key matches the flow entry number f4 of high speed flow table 1200 since it is assumed a packet belonging to flow 2 was received. The large scale flow table search processor 902 rewrites the statistic information 1203 of the flow entry number f4 that matched the search key flow conditions. More specifically, the search processor 902 adds a 1 to the packet count for the flow entry number f4, adds the byte count of the received packet to the byte count, records the input port number within that device header into the input port number, and records the output port number within that search result information into the output port number.

The operation for registering a new flow entry of the flow register-delete processor 1005 is described next. When searching the high speed flow table 1100 and there are no matches among any of the flow entries, the high-speed flow table search processor 1002 recognizes packets input to the router 900 that belong to new flows, and sends a new flow receive notification to the flow register-delete processor 1005. The flow register-delete processor 1005 that received that new flow receive notification, extracts information utilized in flow conditions for the high speed flow table, from that received header information, and sends it along with the flow register command to the high-speed flow table search processor 1002.

The flow register-delete processor 1005 manages the free memory space stored in the high speed flow table. The processor 1005 also notifies the high-speed flow table search processor 1002 of memory addresses for new flows that should be registered. When there is no free space available to register a new flow in the high speed flow table, a flow deletion process as described next is performed. The high-speed flow table search processor 1002 that receives the memory address that must be registered, information utilized in the flow conditions, and that flow registration command from the flow register-delete processor 1005, sets the flow conditions in that memory address.

The operation for deleting the flow entry of flow register-delete processor 1005 is described next. At fixed time intervals, the flow register-delete processor 1005 loads the packet count 801 (or byte count 802) from statistic information for each flow entry stored in the high speed flow table 1100 and compares them with the values from the previous time the values were loaded. When the comparison results show the values are different from the previous time, then that time is stored as the new time in the flow entry number. When the comparison results show the values are the same as the previous time, a new time corresponding to the flow entry number is not written, and only a 1 is added to the non-rewrite count for that flow number.

When the non-rewrite count for the flow entry number matches that preset count, the flow corresponding to that flow entry number is determined to have terminated. The flow register-delete processor 1005 then sends to the high-speed flow table search processor 1002, a flow delete command and the memory address registered for that flow entry for deletion. The high-speed flow table search processor 1002 that received the memory address of the flow entry for deletion then deletes the flow registered in the memory address.

When a new flow receive notification is received from the high-speed flow table search processor 1002 and there is no free space for registering the new flow stored in the high speed flow table, the flow register-delete processor 1005 searches all flows for the rewritten time stored in each flow. The flow register-delete processor 1005 deletes the flow having the largest differential between the rewrite time and the current time. The flow register-delete processor 1005 sends the flow delete command, and the memory address registered in the flow entry decided to be deleted, to the high-speed flow table search processor 1002. The high-speed flow table search processor 1002 that received the flow delete command, and the memory address that the flow entry for deletion is registered, then deletes the flow registered in that memory address.

The flow register operation in the flow register-delete processor section within the large scale flow table search processor 902 is the same processing as in the flow register-delete processor 1005 described for FIG. 10.

The process for sending statistic information to the collector device after a flow was deleted is described next. The flow register-delete processor 1005 stores statistic information on that deleted flow entry into a memory separate from the memory storing the high speed flow table x1100 (not shown in FIG. 9). The flow register-delete processor 1005 encapsulates statistic information for that deleted flow entry according to a pre-established packet format for statistic information notification and sends it over the network to the collector.

Statistic values for the flow deleted by flow register-delete processor 1005 are accurate, non-sampled flow values and so a sampling rate ½ is set as the sampling rate for information within the pre-established packet format. The flow register-delete processor 1005 also handles processing for statistic information after flow registry-deletion within the large scale flow table search processor 902, to the collector device. However statistic information on flow deleted by the flow registry-deletion section within the large scale flow table search processor 902, are statistical values sampled according to the sampling rate so the sampling information within the pre-established packet format is set as the sampling rate, as search results within the high speed flow table 1100.

Figure 29:
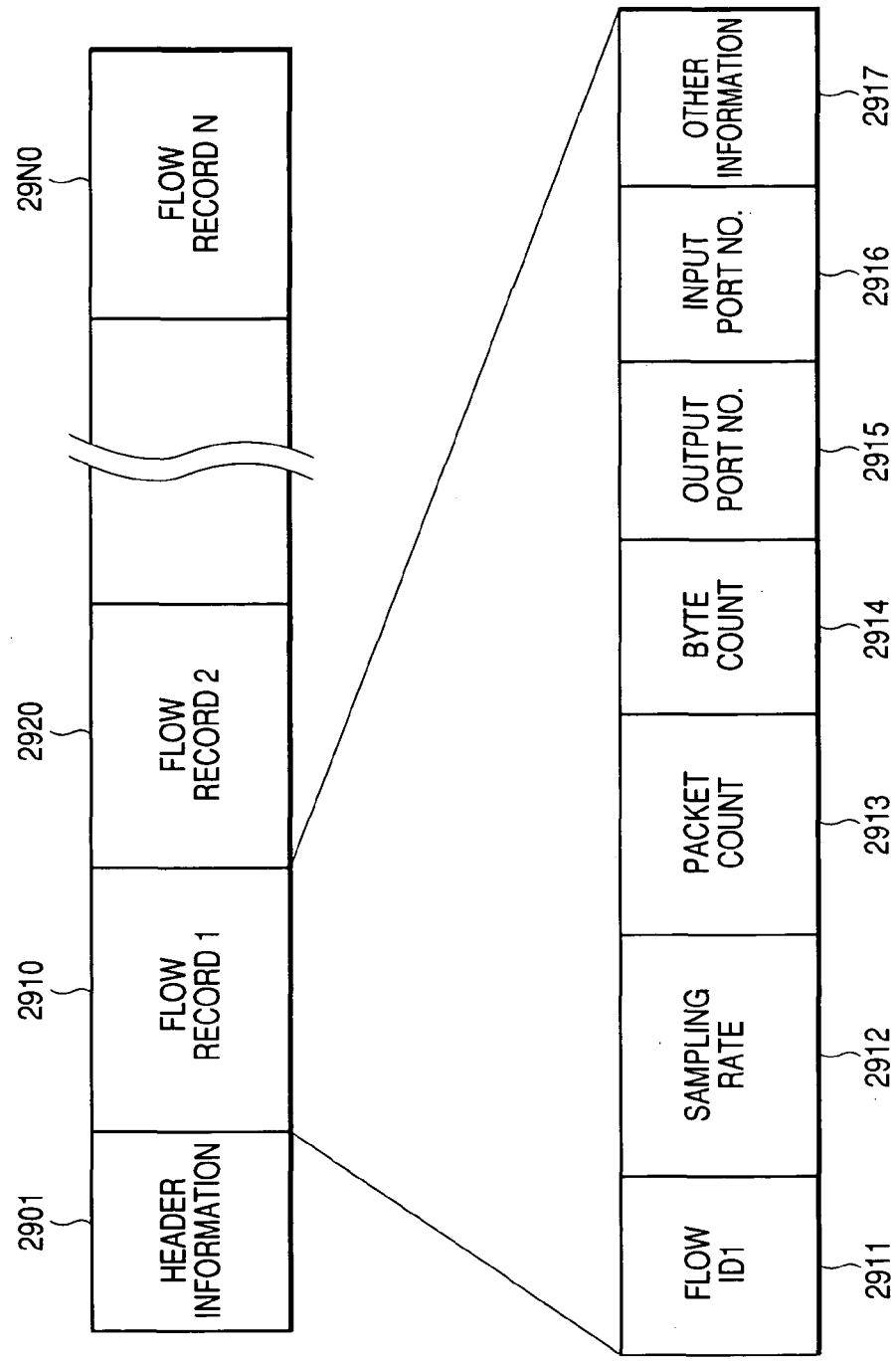
FIG. 29 is a table showing the structure of statistic information notification packet format utilized in the statistics collection device of the present invention.

FIG. 29 is a drawing showing the structure of the statistic information notification packet format used by the statistics collection device of the present invention. The collector device estimates from the sampling rate, the actual packet count for the flow sent over the network. In the statistics collection device of the present invention, the sampling rate may differ even among flows on the same device so a sampling rate is set for each flow in the packet format. The statistic information notification packet format for the FIG. 29 is comprised of a header information 2901, and N (N is a natural number) number of flow information elements (hereafter called flow records). Each flow record is comprised of a flow ID 2911, a flow sampling rate 2912, a packet count 2913, a byte count 2914, an input port 2916, and other information 2917.

The operation of the sample discriminator 1300 is described next while referring to FIG. 13, FIG. 14, FIG. 15, FIG. 16, FIG. 17 and FIG. 18.

Figure 13:
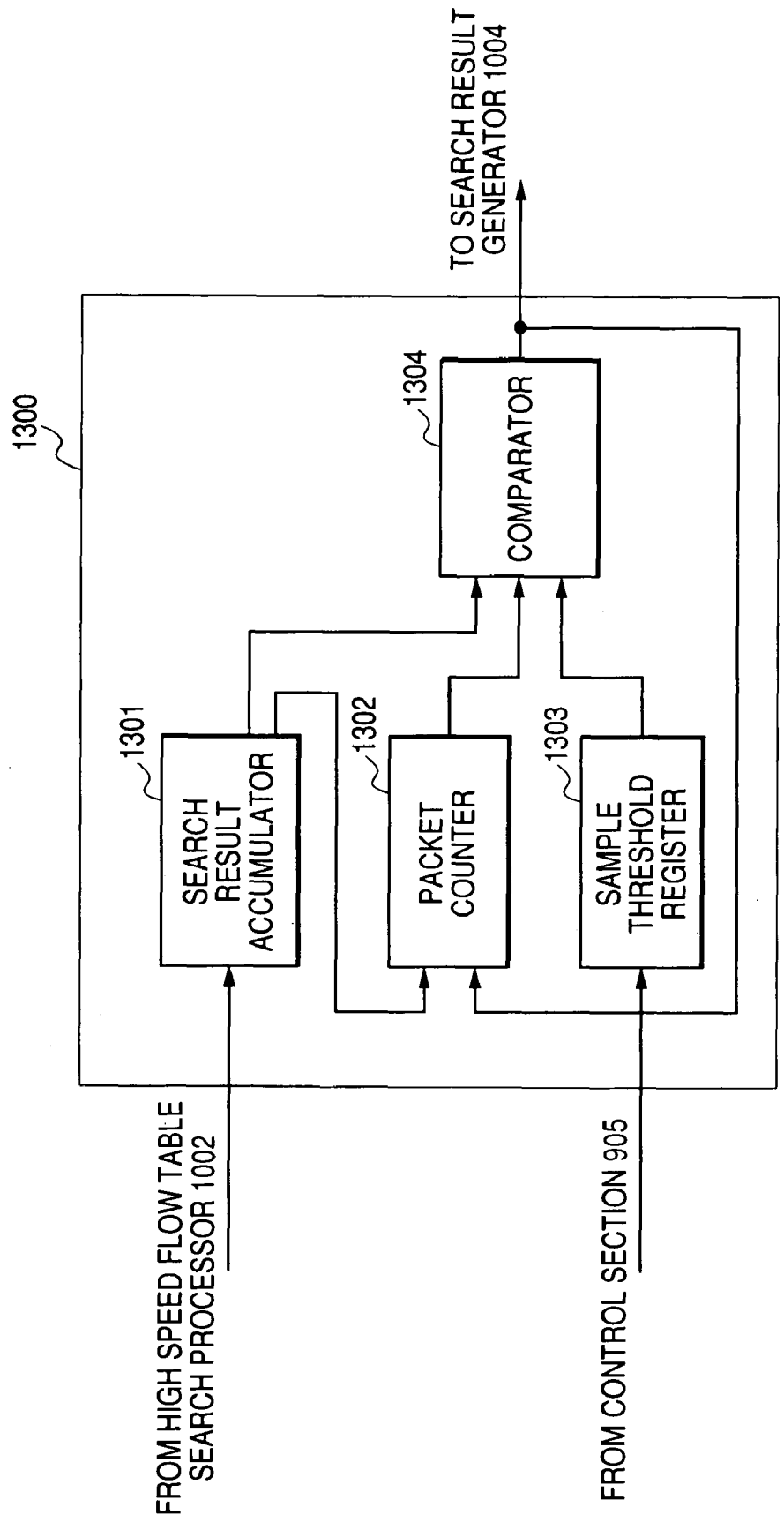
FIG. 13 is a block diagram showing the sample discriminator within the router for the statistics collection method of the present invention.

FIG. 13 is a drawing showing the structure of the sample discriminator 1300. The method for identifying the sample when comparing the predetermined packet interval (period) and the received packet count in FIG. 13 and the received packet count equals the packet interval (period) is described. The method for using one type of sampling rate set in the router 900 and not using the sampling rate values set in the entries for the high speed flow table, is described next.

The sample discriminator of FIG. 13 is comprised of a 1301 search result accumulator 1301, packet counter 1302, sample threshold register 1303, and comparator 1304. Here, a 0 is set in the packet counter 1302 when the router 900 starts up. The administrator of the router 900 sets the packet sample interval (or period) in the sample interval register 1303 via the control section 905. The search result accumulator 1301 receives and accumulates the sample command flags 1303_1 that constitutes the search results of the high speed flow table.

The sampling rate 1303_2 is not used in the present embodiment. When the sample command flag is "1", the search result accumulator 1301 commands the packet counter 1302 to add a "1" to the packet count. The search result accumulator 1301 commands the comparator 1304 to perform the comparison.

The comparator 1304 that received the compare command, receives the packet count from the packet counter 1302 and compares the sample interval of the packet received from the sample interval register 1303. When the comparison results show that the condition of packet count value =value of sample interval register, has been fulfilled, the comparator 1304 sends a copy command to the search result generator 1004, and sends a 0 clear command to the packet counter 1302. The packet counter 1302 that received the 0 clear command, sets the counter value to 0. If the above conditions have not been fulfilled then the copy command is not conveyed to the search result generator 1004, or the 0 clear command is not conveyed to the packet counter.

Figure 14:
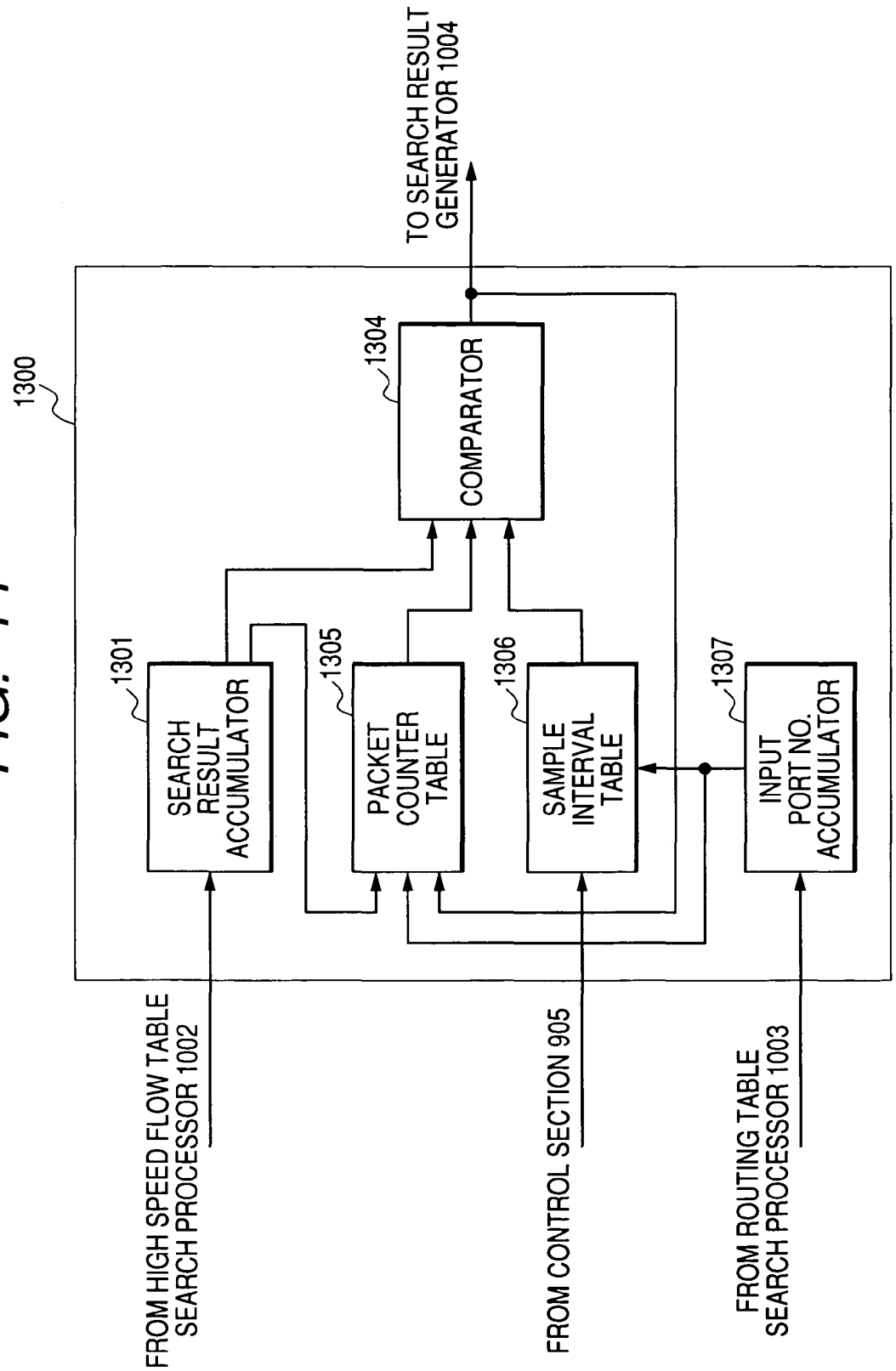
FIG. 14 is a block diagram showing another sample discriminator within the router for the statistics collection method of the present invention.

FIG. 14 is a block diagram showing another structure of the sample discriminator 1300. In FIG. 14, the comparing of the preset packet interval and the received packet count, and the method for deciding to sample when the received packet count is equal to the packet interval is described. The method for using the sampling rate set in each input port of the router 900, without using the value set in the entry for the high speed flow table is also described.

The sample discriminator 1300 of FIG. 14 is comprised of a search result accumulator 1301, a packet counter table 1305, a sample threshold table 1306, a comparator 1304 and an input port number accumulator 1307. The input port number accumulator 1307 receives the input port number from the header information storage section 1001.

FIG. 15 shows the structure of the packet counter table 1305. The packet counter table 1305 holds the packet count for each input port number and all counters are set to a 0 during startup of the router 900. FIG. 16 shows the structure of the sample interval table 1306. The administrator of the router 900 sets the packet sample interval for each input port number in the sample interval table 1306 by way of the control section 905. The search result accumulator 1301 receives and accumulates the sample command flag 1103_1 constituting the search results from the high speed flow table from the high speed flow table search processor 1002. The sampling rate 1103_2 is not used in the case of the present embodiment. When a "1" is set in the sample command flag, the search result accumulator 1301 commands the packet counter to just add a 1 to the packet count corresponding to the input port number.

The search result accumulator 1301 commands the comparator 1304 to make a comparison. The comparator 1304 that receives the compare command, receives a packet count from the packet counter table 1305 that matches the input port number. The comparator 1304 then compares the sample period of the packet matching that input port number. When the comparison results show that the condition of packet count value=value of sample interval register, has been fulfilled, the comparator 1304 sends a copy command to the search result generator 1004, and sends a packet counter 0 clear command to the packet counter table 1305 matching the input port number.

The packet counter 1305 that received the 0 clear command, sets the counter value that matches the input port number to 0. If the above conditions have not been fulfilled, then the comparator 1304 does not convey the copy command to the search result generator 1004, or the 0 clear command for the corresponding input port number to the packet counter table 1305.

Figure 17:
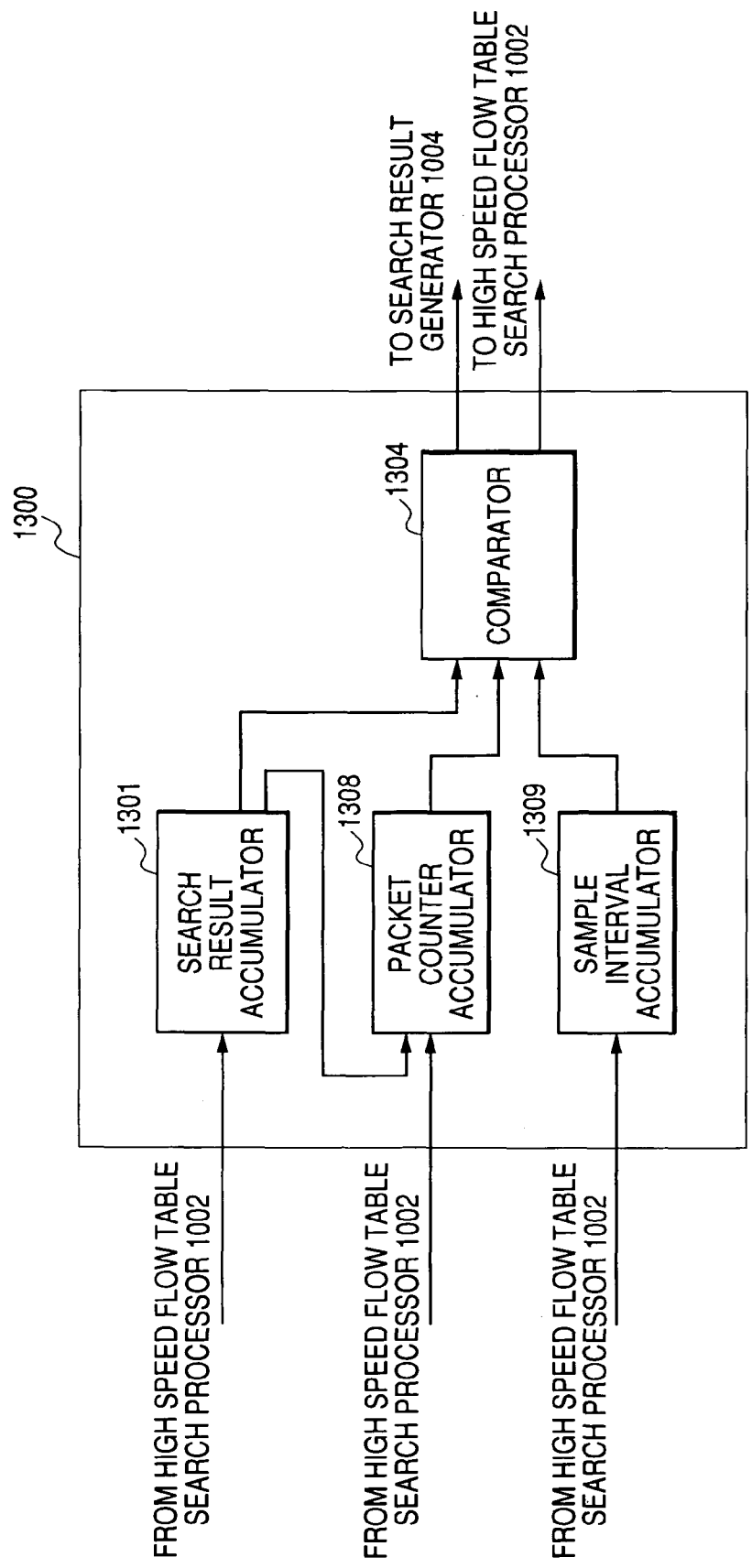
FIG. 17 is a block diagram showing another sample discriminator within the router for the statistics collection method of the present invention.

FIG. 17 shows another structure of the sample discriminator 1300 different from those in FIG. 13 and FIG. 14. In FIG. 17, the comparing of the preset packet interval and the received packet count, and the method for deciding to sample when the received packet count is equal to the packet interval are described. The method for using the value set in the entry for the high speed flow table as the sampling rate is also described.

The sample discriminator 1300 of FIG. 17 is comprised of a search result accumulator 1301, a search result accumulator 1301, a packet counter accumulator 1308, a sample interval accumulator 1309, and a comparator 1304.

FIG. 18 shows the structure of the high speed flow table 1100 of the present embodiment. The flow conditions of the present embodiment and the statistic information are the same as shown in FIG. 11, so the flow conditions and statistic information are omitted in FIG. 18. The search results of FIG. 18 are made up of a sample command flag 1801, a packet counter 1802, and a sample interval 1803. The packet counter is set to 0 when the router 900 starts up. The administrator of the router 900 sets the sample interval 1803 by way of the control section 905. The sample interval of the packet for each entry is set to command a large scale flow table search. The flow table 1100 setting may also be made from control console 3000 of FIG. 30. The setting may also be made from a control console 3000 connected by way of the network of FIG. 31.

The search result accumulator 1301 receives and accumulates the flow entry number fields 1101 that correspond to the sample command flag 1103_1 search results of the high speed flow table, from the high speed flow table search processor 1002. The packet counter accumulator 1308 receives and accumulates the packet counts as search results of the high speed flow table from the high speed flow table search processor 1002. The sample interval accumulator 1309 receives and accumulates sample intervals as search results of the high speed table from the high speed flow table search processor 1002.

When the sample flag value is "1", the search result accumulator 1301 commands the packet counter accumulator 1308 to add only a 1 to the accumulated packet count. The search result accumulator 1301 also commands the comparator 1304 to make a comparison, and send the flow entry numbers that matched. The comparator 1304 that received the compare command, receives the accumulated packet count to which only a 1 was added from the packet counter accumulator 1308 and compares the packet count with the accumulated packet sample interval received from the sample interval accumulator 1307.

When the results of the comparison are that the condition of, packet count value=sample interval register value was fulfilled, then the comparator 1304 sends a copy command to the search result generator 1004, sends matching flow entry numbers, and a packet counter 0 clear command for the corresponding flow entry number, to the high speed flow table search processor 1002 the high speed flow table search processor 1002 that received that 0 clear command, sets a 0 as the packet counter value. However if the above condition was not fulfilled then the comparator 1304 does not send a copy command to the search result generator 1004.

The comparator 1304 sends a command (Hereafter called the packet count increment command.) to record the packet counter value incremented only by a 1, in the packet counter corresponding to that flow entry number, and to record that matching flow entry number in the high speed flow table search processor 1002. The high speed flow table search processor 1002 that received the packet count increment command, and the matching flow number, records a packet counter value added with only a 1, to the packet counter corresponding to the flow number that was a match.

Figure 19:
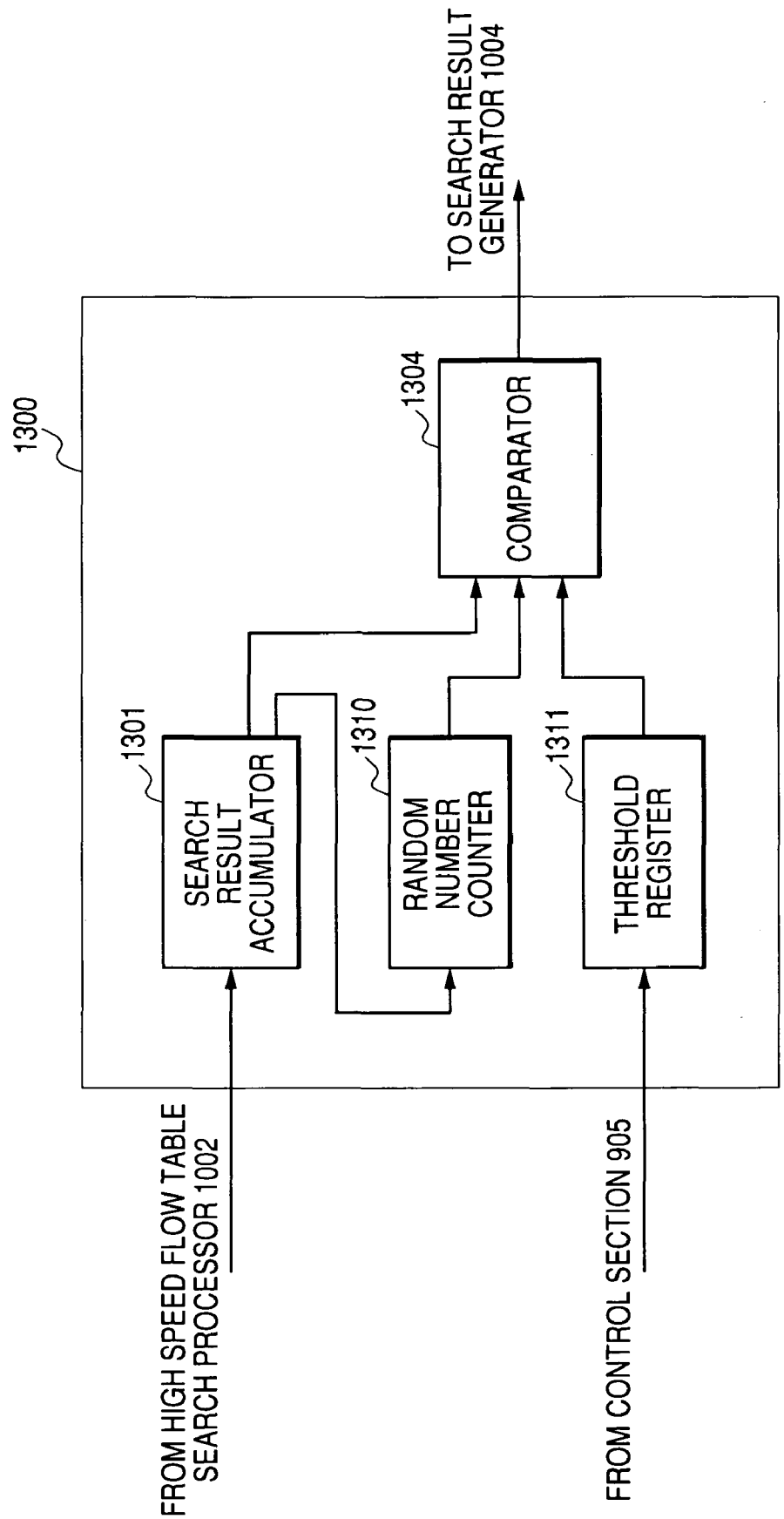
FIG. 19 is a block diagram showing another sample discriminator within the router for the statistics collection method of the present invention.

FIG. 19 shows another structure of the sample discriminator 1300 different from those structures in FIG. 13, FIG. 14, and FIG. 17. The example in FIG. 19 describes the method for discriminating the sample when comparing a pseudo-random number with the preset threshold value, and the pseudo-random number is smaller (or larger) than the threshold. Further, the method described here, uses one type of sampling rate set in the router 900 and does not use the value set in the entry for the high speed flow table. In the present embodiment, the sampling rate corresponds to the threshold.

The discrimination section 1300 of FIG. 19 is comprised of a search result accumulator 1301, a random number counter 1310, a threshold register 1311, and a comparator 1304. The random number counter 1302 is comprised for example of a linear feedback shift register using multiple flip-flops. The administrator of the router 900 sets the threshold value in the threshold register 1311 by way of the control section 905.

The search result accumulator 1301 receives and accumulates the sample command flag 1103_1 as the search results of the high speed flow table from the high speed flow table search processor 1002. The sampling rate 1103_2 is not used in the present embodiment. When the sample flag value is "1", the search result accumulator 1301 commands the random number counter 1310 to generate a new random number based on the random number counter value. The search result accumulator 1301 also commands the comparator 1304 to make a comparison. The comparator 1304 that received the compare command, receives a newly generated random number from the random number counter 1310, and compares it with the threshold value received from the threshold register 1311. When the comparison results are that the condition, random number≧threshold value is established, the comparator 1304 sends a copy command to the search result generator 1004. If this condition was not established, then the comparator 1304 does not send that copy command to the search result generator 1004.

Figure 20:
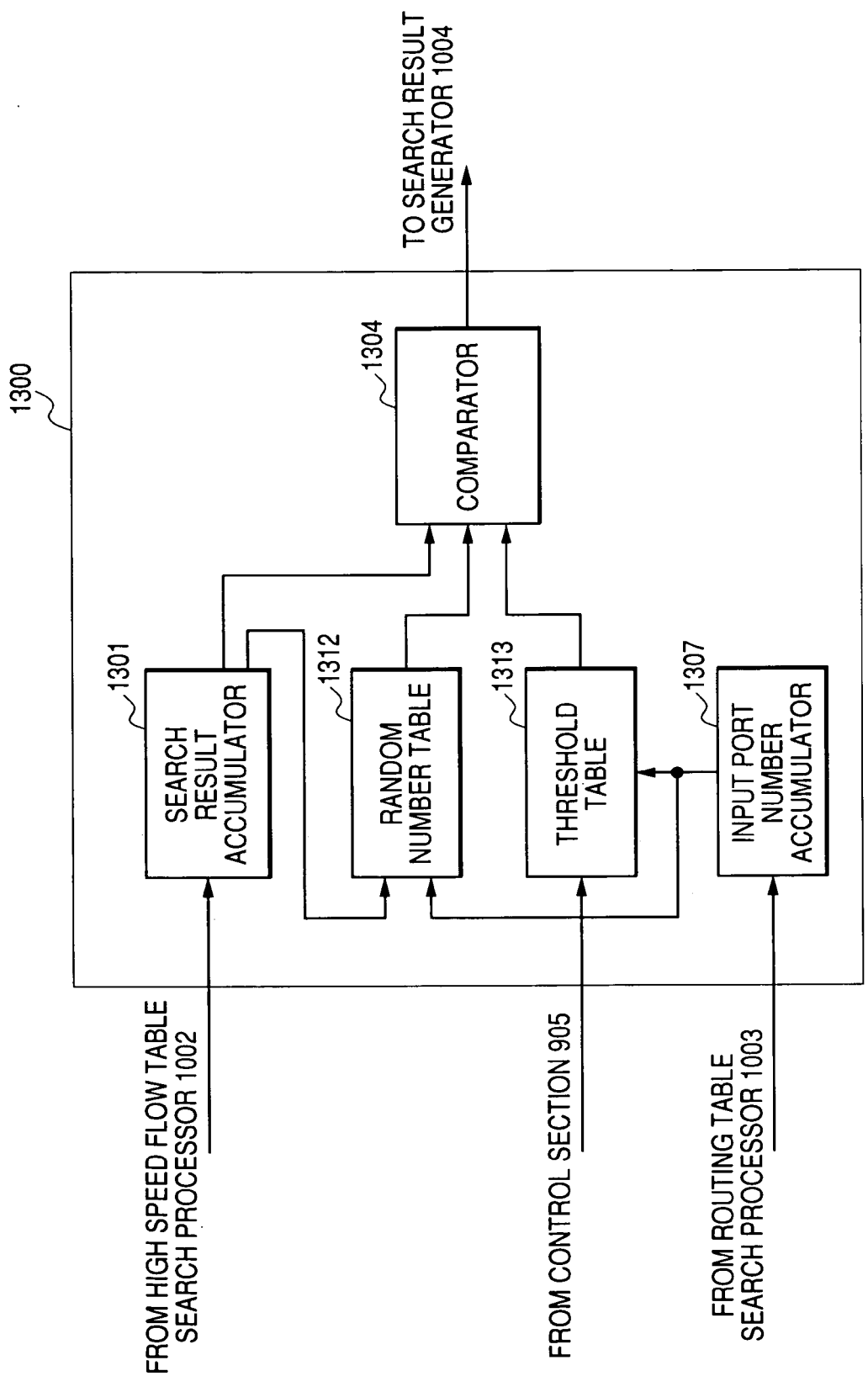
FIG. 20 is a block diagram showing another sample discriminator within the router for the statistics collection method of the present invention.

FIG. 20 shows another structure of the sample discriminator 1300 different from those structures in FIG. 13, FIG. 14, FIG. 17, and FIG. 19. The method in this example describes the method for discriminating the sample by comparing the preset threshold value with the pseudo-random number and that pseudo-random number is smaller (or larger) than that threshold value. In the method described here, the sampling rate type is set in each input port of the router 900, and does not use values set in entries of the high speed flow table. In the present embodiment, the sampling rate corresponds to the threshold.

The sample discriminator 1300 of FIG. 20 is comprised of a search result accumulator 1301, a random number table 1312, a threshold table 1313, a comparator 1304 and an input port number accumulator 1307. The input port number accumulator 1307 receives an input port number from the header information storage section 1001. One structure of the random table 1312 is shown in FIG. 21. The random number table 1312 holds the random numbers for each input port number. These random number counters are for example comprised of by linear feedback shift registers. One example of the threshold value table 1313 is shown in FIG. 22. The threshold value is set in the threshold table 1306, via the control section 905 in each input port set by the administrator of the router 900.

The search result accumulator 1301 receives and accumulates the sample command flag 1103_1 as the search results of the high speed flow table from the high speed flow table search processor 1002. The sampling rate 1103_2 is not used in the present embodiment. When the sample flag value is "1", the search result accumulator 1301 commands the random number table 1312 to generate a new random number based on the random number counter value recorded for the corresponding input port number. The search result accumulator 1301 also commands the comparator 1304 to make a comparison. The comparator 1304 that received the compare command, receives a newly generated random number from the random number table 1312 corresponding to the input port number, and compares it with the threshold value received from the threshold table 1313. When the comparison results are that the condition, random number≧threshold value is established, the comparator 1304 sends a copy command to the search result generator 1004. If this condition was not established, then the comparator 1304 does not send that copy command to the search result generator 1004.

Figure 23:
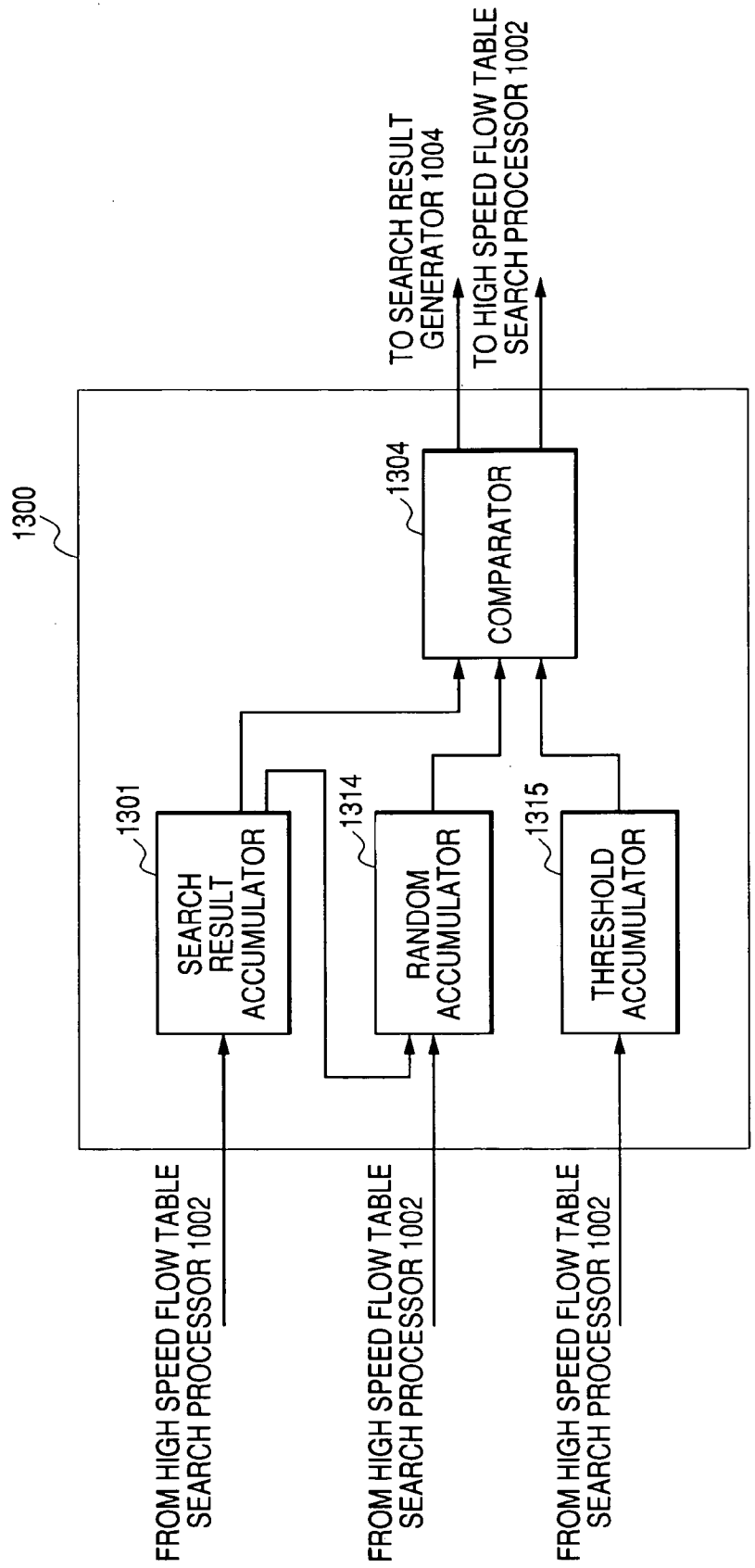
FIG. 23 is a block diagram showing another sample discriminator within the router for the statistics collection method of the present invention.

FIG. 23 shows another structure of the sample discriminator 1300 different from those structures in FIG. 13, FIG. 14, FIG. 17, FIG. 19 and FIG. 20. The example in FIG. 23 describes the method for discriminating the sample when comparing a pseudo-random number with the preset threshold value, and the pseudo-random number is smaller (or larger) than the threshold. Further, the sampling rate method described here, uses the value set in the entry for the high speed flow table. In the present embodiment, the sampling rate corresponds to the threshold.

The discrimination section 1300 of FIG. 23 is comprised of a search result accumulator 1301, a random number accumulator 1314, a threshold accumulator 1315 and a comparator 1304. FIG. 24 shows the structure of the high speed flow table 1100 of the present embodiment. The flow conditions and statistic information in the case of the present embodiment are the same as shown in FIG. 11 so the related flow conditions and statistic information in FIG. 24 are omitted. The search result 2400 of FIG. 24 is comprised of a sample command flag 2401, random number 2402 and threshold value 2403. The random number 2402 of each flow entry is a value generated and stored by a random number generator circuit utilizing a linear feedback shift register. A threshold value for each entry used to command a large scale flow table search is set by the router 900 system administrator in the threshold 2403 via the control section 905.

The search result accumulator 1301 receives and accumulates the field 1102 flow entry numbers that match the sample command flag 1103_1 as the search result of the high speed flow table, from the high speed flow table search processor 1002. The random number accumulator 1314 receives and accumulates random numbers from the high speed flow table search processor 1002 as high speed flow table search results. The threshold accumulator 1315 receives and accumulates threshold values from the high speed flow table search processor 1002 as search results from the high speed flow table. When the sample command flag is "1", the search result accumulator 1301 commands the random number accumulator 1314 to generate new random numbers based on the accumulated random numbers.

The search result accumulator 1301 commands the comparator 1304 to make a comparison and to send matching flow entry numbers.

The comparator 1304 that received the compare command, receives a newly generated random number from the random number accumulator 1314 and compares the packet count with the accumulated packet sample intervals received from the sample interval accumulator 1307. When the comparison results are that the condition, random number≧threshold value is established, the comparator 1304 sends a copy command to the search result generator 1004. If this condition was not established, then the comparator 1304 does not send that copy command to the search result generator 1004.

The comparator 1304 sends a command to the high speed flow table search processor 1002 to record the matching flow entry numbers, and the newly generated random number corresponding to the flow entry numbers. The high speed flow table search processor 1002 that received the command to record the random numbers, records the random numbers received from the comparator 1304, into the corresponding flow entry number.

Second Embodiment

A structure different from the packet forwarding device shown in FIG. 9 is described next while referring to FIG. 25. The router 900 of FIG. 25 contains the input port number ICmn (m=1 through M, n=1 through N), the output port number OCmn (m=1 through M, n=1 through N) The router 900 is comprised of a packet receive processor 901, a search processor 1000, a large scale flow table search processor 902, a large scale flow table 1200, a routing table 903, a packet transmit processor 904, one or more port cards 2501_m (m=1 through M) made up of the control section 905, and a crossbar switch 2502 mutually connecting one or more port cards, and an overall controller 2503 to control the entire device.

The process when receiving the packet is the same as for the router 900 shown in FIG. 9. However, the point of difference here is that the packet receive processor 901 that received the statistic information from the search processor 1000 has the crossbar switch 2502 as the destination for sending the packet data attached with the statistic information. The crossbar switch 2502 that received the packet data, extracts the output port number from the search result information, discriminates (or identifies the circuit card storing circuits corresponding to the output port number, and sends the packet data to the packet transmit processor 904 within the identified port card. The remainder of the process is the same as shown in FIG. 9 for the router 900.

Third Embodiment

Figure 25:
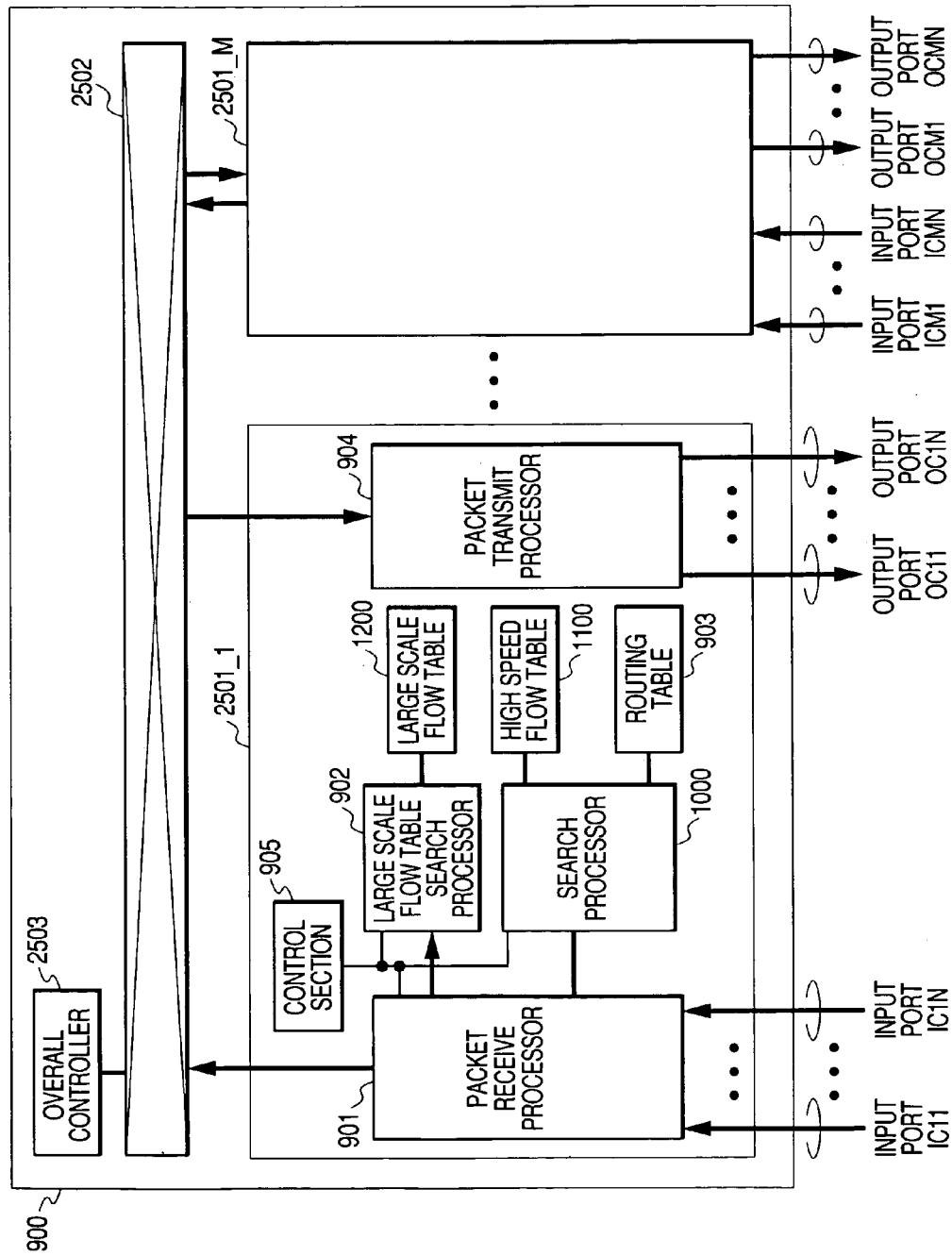
FIG. 25 is a block diagram showing the structure of another router for the statistics collection method of the present invention.
Figure 26:
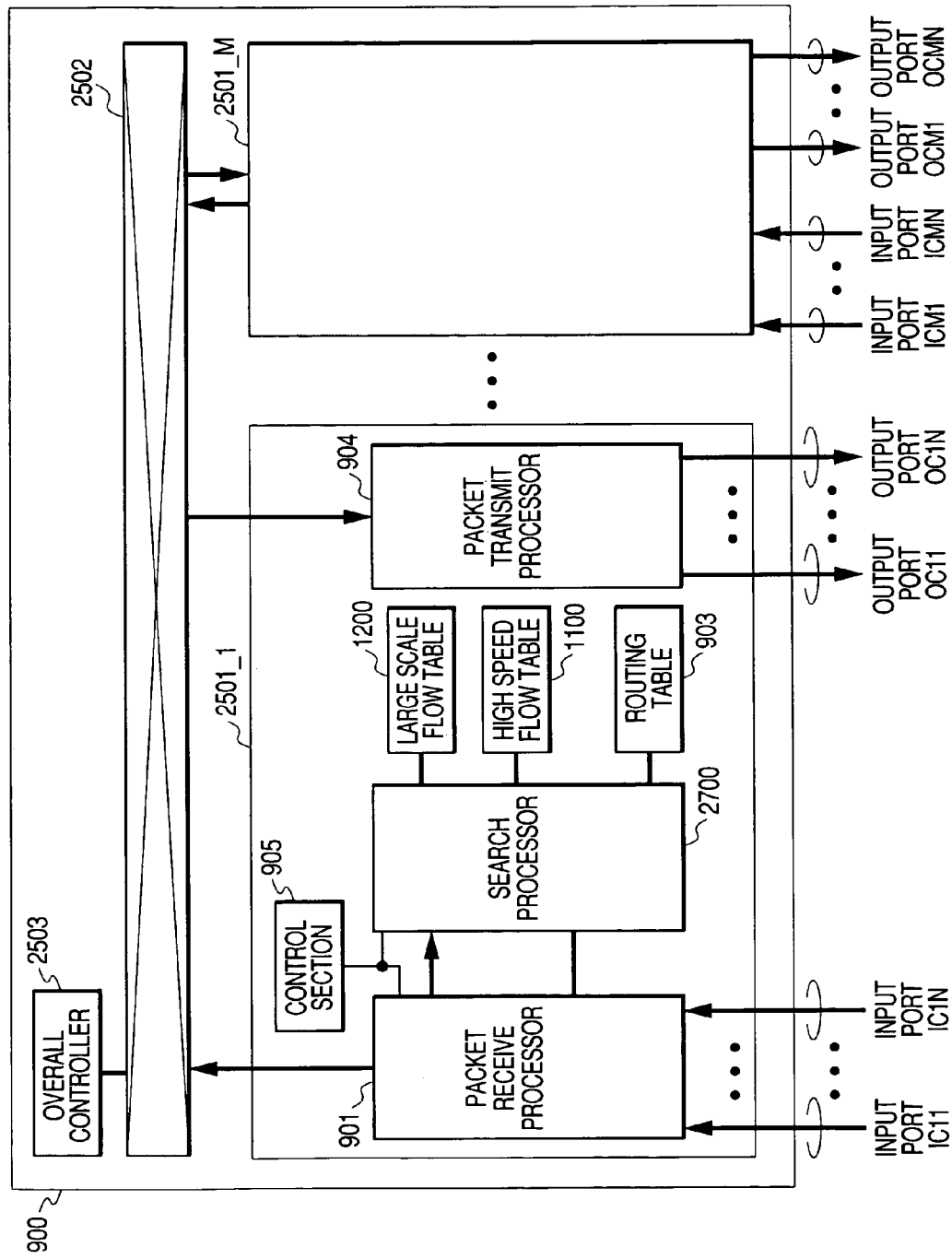
FIG. 26 is a block diagram showing the structure of another router for the statistics collection method of the present invention.
Figure 27:
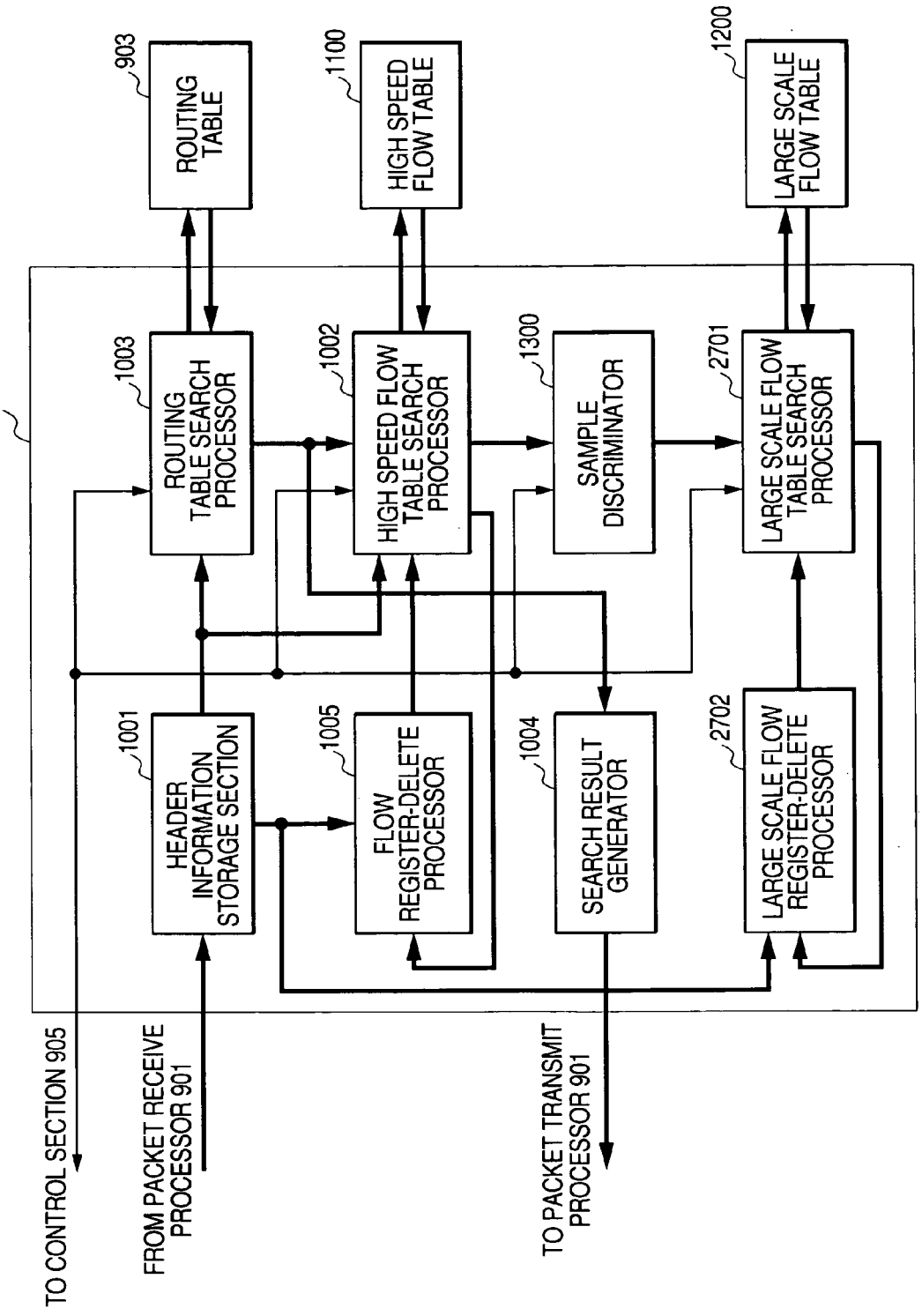
FIG. 27 is a block diagram showing the structure of the search processor within the router shown in FIG. 26.

FIG. 26 shows a structure different from the packet forwarding device structures shown in FIG. 9 and FIG. 25. The router 900 of FIG. 26 in this example includes a large search processor in the search processor 2700. Otherwise, the operation and configuration is identical to the router 900 of FIG. 25. FIG. 27 shows a structure of the search processor 2700 of the router 900 shown in FIG. 26. The search processor 2700 differs from the search processor 1000 shown in FIG. 10 in that is possesses a large scale flow table search processor 2701 for searching a large scale flow table, and a large scale flow register-delete processor 2702 for registering and deleting flows in the large scale flow table.

When determined that the sample discrimination results of the sample discriminator 1300 and the large scale flow table search were made, instead of sending a copy command from the search discriminator 1300 to the search result generator 1004, this operation differs in that a command for a large scale flow table search is sent directly to the large scale flow table search processor 2701. The large scale flow table search processor 2701 that received that search command, generates a search key by extracting information required for making a search key from the header information received from the header information storage section 1001, searches the large scale flow table 1200, and collects the statistic information. The operation for the large scale flow registry and deletion processes in the large scale flow register-deletion processor are the same as the flow register process and deletion process in the flow register-delete processor 1005.

Fourth Embodiment

Figure 28:
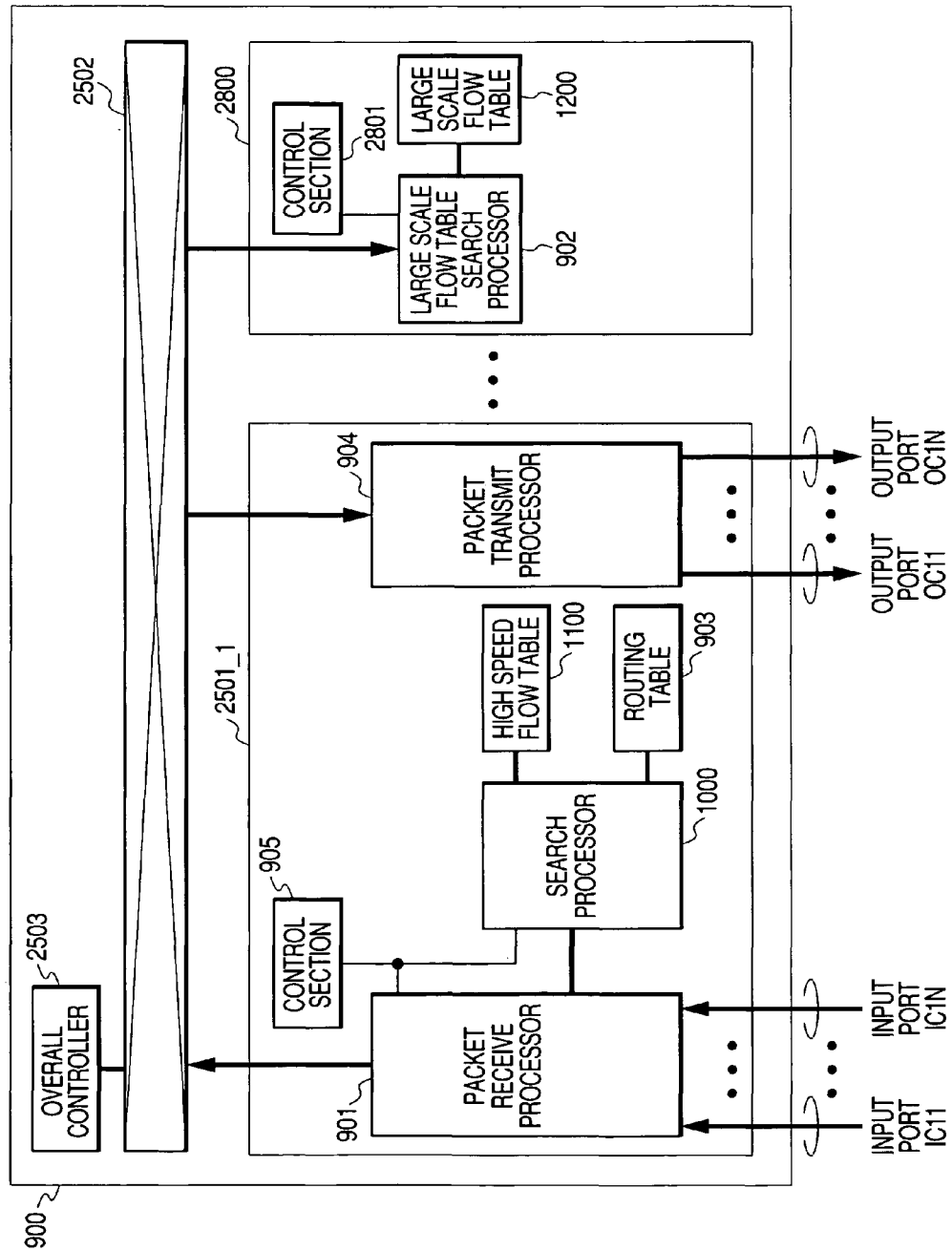
FIG. 28 is a block diagram of the structure of another router for the statistics collection method of the present invention.

FIG. 28 shows a structure different from the packet forwarding device structures shown in FIG. 9 FIG. 25 and FIG. 26. The router 900 of FIG. 28 contains a dedicated statistic collection processing card 2800 which is separate from the port card 2501_m (m=1 through M). This dedicated statistic information processing card is mutually connected with the port card 2501_m by way of the crossbar switch. The statistic collection processing card 2800 is comprised of a large search processor 902, a large scale flow table 11200, and a control section 2801 for controlling the statistic collection processing card 2800. The crossbar switch 2502 is installed on a dedicated board. This dedicated board contains a card connection means (for example, a mounting slot) for mounting the statistic collection processing card 2800.

The processing when a packet is received is the same as that for the router 900 shown in FIG. 25. However, the point of difference here is that the packet receive processor 901 that received the search information copy from the search processor 1000, sends the packet data attached with that search information copy to the statistic collection processing card 2800 via the crossbar switch 2500. The subsequent large scale flow table search processing is the same as the operation described in FIG. 9.

The router 900 shown in FIG. 28 possessed only one statistic collection processing card, however the router may possess multiple statistic information collection processing cards. In that case, a card number may be added for identifying one among the multiple statistic information collection processing cards. Setting the card numbers allows dispersing the flow table processing load for multiple flows among multiple statistic information collection processing cards when searching large scale flow tables. The processing load can also be dispersed among multiple statistic information collection processing cards by other methods, without setting card numbers for statistic collection processing cards for each flow. Methods for dispersing the load include calculating a hash value according to an appropriate hash function from the header information in the received packet, and then selecting a dedicated statistic collection processing card based on the hash value, etc.

What is claimed is:

1. A packet forwarding device equipped with a statistics collection device for collecting statistic information for each combination of multiple pieces of information contained in a received packet header, comprising: a means for transmitting the received packet subjected to the specified processing, wherein the statistics collection device contains a first table, a second table, and a search table discrimination table for selecting either the first table or the second table based on information contained in the header, and a means for searching the first table, the second table and the search table discrimination table, the first table and the second table hold at least entries containing combinations of multiple pieces of information contained in the header, and statistic information for collection corresponding to the information, the combinations of multiple pieces of information contained in the header, and information indicating the table corresponding to that information are stored in the search table discrimination table, the first table is configured as a high speed search table for selectively skipping packet statistic information collection per flow type via sampling, and the second table is configured as a large scale search table for collecting packet statistic information for each flow type therein, when a packet is received, the search table discrimination table is searched based on a combination of multiple pieces of information contained in the header of the received packet, the statistics collection device selects either the first table or the second table according to the results of the search of the discrimination table, the selected table is searched statistic information of the received packet, and the statistic information is collected accordingly, and the first table is stored in a Content Addressable Memory (CAM) and the second table is stored in a Random Access Memory (RAM), wherein the second table is formatted in a tree structure comprised of the combinations of multiple pieces of information contained in the received packet header and corresponding statistic information.

2. A packet forwarding device according to claim 1, wherein a protocol value within the IP (Internet Protocol) header, and a source port number or a destination port number within the TCP (Transmission Control Protocol) header or the UDP (User Datagram Protocol) are stored as the discrimination table search keys within the search table discrimination table.

3. A packet forwarding device according to claim 1, wherein the statistics collection device collects any one element of information contained in a group comprised of:

a packet count sum matching multiple information elements contained in the header of the received packet, the sum of the byte counts of the received packet, the input port number of the received packet, the output port number of the received packet, as well as the time on the statistics collection device that the packet was received, and the time of the first received packet which matches with a combination of multiple information elements within the header of the received packet, according to the time the packets were received.

4. A packet forwarding device according to claim 1, comprising:

a sampling rate storage means to store a sampling rate for the second table, and a combination of multiple information elements within the header of the received packet, and a means to decide whether or not to search the second table based on the sampling rate set in the sampling rate storage means when the selected table is the second table from search results of the search table discrimination table.

5. A packet forwarding device according to claim 4, comprising:

an input interface for holding the multiple communication ports, and a sampling rate storage means formed in the multiple communication ports, and a control means for setting the sampling rate from an external section.

6. A packet forwarding device according to claim 5, comprising a function to send the statistic information collected in the first table or the second table to another device connected via a network, wherein when sending to another device, said device sends statistic information according to a sampling rate set for a combination of multiple information elements within the header.

7. A packet forwarding device according claim 5, wherein the control means contains a means to display the search table discrimination table, and a means to select desired information from the sampling rates stored in the discrimination table, and a means to change the selected information.

8. A packet forwarding device according to claim 7, wherein:

the first table contains the search table discrimination table, the first table contains entries storing identification information for deciding whether or not to search the second table, and said device searches the first table when a packet is received, and decides whether or not to search the second table according to the identification information values.

9. A packet forwarding device according to claim 7, comprising a function to send the statistic information collected in the first table or the second table to another device connected via a network, wherein when sending to another device, said device sends statistic information according to a sampling rate set for a combination of multiple information elements within the header.

10. A packet forwarding device according to claim 5, wherein:

the first table contains the search table discrimination table, the first table contains entries storing identification information for deciding whether or not to search the second table, and said device searches the first table when a packet is received, and decides whether or not to search the second table according to the identification information values.

11. A packet forwarding device according to claim 4, wherein the control means contains a means to display the search table discrimination table, and a means to select desired information from the sampling rates stored in the discrimination table, and a means to change the selected information.

12. A packet forwarding device according to claim 11, wherein:

the first table contains the search table discrimination table, the first table contains entries storing identification information for deciding whether or not to search the second table, and said device searches the first table when a packet is received, and decides whether or not to search the second table according to the identification information values.

13. A packet forwarding device according to claim 11, comprising a function to send the statistic information collected in the first table or the second table to another device connected via a network, wherein when sending to another device, said device sends statistic information according to a sampling rate set for a combination of multiple information elements within the header.

14. A packet forwarding device according to claim 4, comprising a function to send the statistic information collected in the first table or the second table to another device connected via a network, wherein when sending to another device, said device sends statistic information according to a sampling rate set for a combination of multiple information elements within the header.

15. A packet forwarding device according to claim 4, wherein:
the first table contains the search table discrimination table,
the first table contains entries storing identification information for deciding whether or not to search the second table, and
said device searches the first table when a packet is received, and decides whether or not to search the second table according to the identification information values.

16. A packet forwarding device according to claim 1, wherein:
the first table contains the search table discrimination table,
the first table contains entries storing identification information for deciding whether or not to search the second table, and
said device searches the first table when a packet is received, and decides whether or not to search the second table according to the identification information values.

17. A packet forwarding device according to claim 1, wherein the means for searching the first table, the second table, and the search table discrimination table, comprises a first LSI or network processor or microprocessor for searching the first table, and a second LSI or network processor or microprocessor for searching the second table.

18. A packet forwarding device according to claim 17, wherein the second table, and the second LSI or network processor or microprocessor for searching the all-period second table are implemented on a statistic collection card, and said device comprises a connection means for loading the statistic collection card into the statistics collection device.

19. A packet forwarding device according to claim 1, wherein a flow type is defined by flow conditions including a source IP address, a destination IP address, a upper layer protocol, a type of service, a source port number, and a destination source port number.

20. A packet forwarding device according to claim 1, wherein the combination of multiple pieces of information used to search the search table discrimination table include a sample command flag, and one of: (1) a sampling rate, (2) a sample interval, and (3) a random number and a threshold value.

21. A packet forwarding device according to claim 20, wherein if the random number is more than or equal to the threshold value, packet statistic information is collected on the received packet.

22. A packet forwarding device comprising:
a means for receiving a packet, a statistics collection device for collecting statistic information for each combination of multiple information contained in the received packet header, and a means for transmitting the received packet subjected to the specified processing, wherein
the statistics collection device having a first table, a second table, and a search table discrimination table for selecting either the first table or the second table based on information contained in the header,
the first table and the second table being comprised of entries containing a combination of multiple information elements within the header and statistic information corresponding to that information, and a means for searching the first table and the second table based on information contained in the header,
the statistics collection device further having a storage means for storing statistic collection frequency information for collected statistic information in a combination of multiple information elements, and a selection means for selecting the statistic collection frequency information stored in a combination of multiple information elements within the header from the storage means based on the header information, wherein
the first table is configured as a high speed search table for selectively skipping packet statistic information collection per flow type via sampling, and the second table is configured as a large scale search table for collecting packet statistic information for each flow type therein,
when a packet is received, said statistics collection device selects statistic collection frequency information corresponding to said combination of multiple information elements contained in the header of the packet received from the storage means, and decides whether or not to collect statistic information contained in either the first table or the second table as selected, based on the statistic collection frequency information,
the first table is stored in a Content Addressable Memory (CAM) and the second table is stored in a Random Access Memory (RAM), wherein the second table is formatted in a tree structure comprised of the combinations of multiple pieces of information contained in the received packet header and corresponding statistic information, and
the statistics collection device contains one or more tables, a search table discrimination table for selecting which of the one or more tables to search based on said combination of multiple information elements contained in the header, and a means for searching a table, among the one or more tables,
when a packet is received, the statistics collection device searches the search table discrimination table based on said combination of multiple information elements contained in the header of the received packet, and selects a table among the one or more tables for making a search, and
the statistics collection device determines the statistic information that must be searched and collected from the selected search table and also decides whether or not to search the selected search table, and collects the statistic information when decided to make a search.

* * * * *